US012567509B2

(12) United States Patent
Agace

(10) Patent No.: US 12,567,509 B2
(45) Date of Patent: Mar. 3, 2026

(54) SPENT NUCLEAR FUEL STORAGE RACK SYSTEM WITH REACTIVITY CONTROLS

(71) Applicant: HOLTEC INTERNATIONAL, Camden, NJ (US)

(72) Inventor: Stephen J. Agace, Middletown, DE (US)

(73) Assignee: HOLTEC INTERNATIONAL

( * ) Notice: Subject to any disclaimer, the term of this patent is extended or adjusted under 35 U.S.C. 154(b) by 533 days.

(21) Appl. No.: 18/074,585

(22) Filed: Dec. 5, 2022

(65) Prior Publication Data

US 2023/0178260 A1 Jun. 8, 2023

Related U.S. Application Data

(60) Provisional application No. 63/285,502, filed on Dec. 3, 2021.

(51) Int. Cl.
*G21C 19/40* (2006.01)
*G21C 19/07* (2006.01)
*G21C 19/32* (2006.01)

(52) U.S. Cl.
CPC ............. *G21C 19/40* (2013.01); *G21C 19/07* (2013.01); *G21C 19/32* (2013.01)

(58) Field of Classification Search
None
See application file for complete search history.

(56) References Cited

U.S. PATENT DOCUMENTS

| | | | | |
|---|---|---|---|---|
| 4,163,690 A * | 8/1979 | Jabsen | ................. | G21C 3/3563 376/442 |
| 4,655,995 A | 4/1987 | Freeman et al. | | |
| 4,988,473 A | 1/1991 | Mueller et al. | | |
| 5,841,825 A | 11/1998 | Roberts | | |

(Continued)

FOREIGN PATENT DOCUMENTS

| | | | | |
|---|---|---|---|---|
| EP | 0123603 B1 * | 6/1988 | | |
| EP | 2613322 A1 * | 7/2013 | ........... | G21C 3/3305 |
| JP | 2014163761 A * | 9/2014 | | |

OTHER PUBLICATIONS

English machine translation for EP-0123603-B1 (Year: 1988).*

(Continued)

*Primary Examiner* — Robert H Kim
*Assistant Examiner* — Alina Kaliszewski
(74) *Attorney, Agent, or Firm* — The Belles Group, P.C.

(57) ABSTRACT

A nuclear fuel storage system comprises a fuel rack immersible in a fuel pool which comprises a baseplate and a cellular body extending from the baseplate. The body comprises plural cell walls arranged to define an array of upwardly open cells each configured to store a nuclear fuel assembly therein. A raised fuel assembly support ring may be disposed at the bottom of each cell on the baseplate to engage and support a fuel assembly. A neutron absorber insert disposed in at least one cell comprises a bottom end configured to frictionally engage the support ring to secure the neutron absorber insert therein. The absorber insert comprises resiliently deformable radial locking protrusions which frictionally engage an outward facing annular side surface of the support ring in one embodiment. The absorber insert may be retrofit into existing racks to restore reactivity control.

20 Claims, 18 Drawing Sheets

(56) References Cited

U.S. PATENT DOCUMENTS

| | | | | |
|---|---|---|---|---|
| 6,442,227 | B1 | 8/2002 | Iacovino, Jr. et al. | |
| 8,208,597 | B2 | 6/2012 | Cantonwine et al. | |
| 8,848,853 | B2 * | 9/2014 | Foussard | G21C 19/40<br>376/272 |
| 9,875,819 | B2 | 1/2018 | Singh et al. | |
| 10,535,440 | B2 | 1/2020 | Agace et al. | |
| 10,580,540 | B2 | 3/2020 | Leuenroth et al. | |
| 10,910,119 | B2 | 2/2021 | Singh et al. | |
| 10,991,472 | B2 | 4/2021 | Rosenbaum et al. | |
| 11,081,249 | B2 | 8/2021 | Singh et al. | |
| 2007/0183556 | A1 * | 8/2007 | Labarriere | G21C 3/3305<br>376/440 |
| 2008/0267340 | A1 * | 10/2008 | Higgins | G21C 3/322<br>376/439 |
| 2021/0057118 | A1 | 2/2021 | Singh et al. | |
| 2021/0074444 | A1 * | 3/2021 | Singh | G21C 19/07 |
| 2021/0225537 | A1 | 7/2021 | Singh et al. | |

OTHER PUBLICATIONS

English machine translation for JP-2014163761-A (Year: 2014).*

DREAM Inserts for Enhanced Pool Reactivity Control: A Solution for Degrading Neutron Absorbing Material or Power Uprates, Holtec Technical Information Bulletin is copyrighted by Holtec International, https://holtecinternational.com/innovation/technical-bulletins/dream-inserts-for-enhanced-pool-reactivity-controla-solution-for-degrading-neutron-absorbing-material-or-power-uprates/, Retrieved Nov. 7, 2022, pp. 1-2.

* cited by examiner

SPENT NUCLEAR FUEL STORAGE RACK SYSTEM WITH REACTIVITY CONTROLS

CROSS-REFERENCE TO RELATED APPLICATIONS

The present application claims the benefit of priority to U.S. Provisional Application No. 63/285,502 filed Dec. 3, 2021; the entirety of which is incorporated herein by reference.

BACKGROUND

The present invention generally relates to systems for wet storage of spent nuclear fuel, and more particularly to an improved nuclear fuel storage rack system comprising reactivity controls for use in a fuel pool in a nuclear generation plant.

A conventional free-standing, high density nuclear fuel rack is a cellular structure typically supported from the floor or bottom slab of the water-filled spent fuel pool. The cellular region comprises an array of narrow and elongated prismatic cavities forming open cells which are each sized to accept a single nuclear fuel assembly comprising a plurality of spent nuclear fuel rods. The term “active fuel region” denotes the vertical space above the baseplate within the rack where the enriched uranium is located. The bottom extremity of the fuel storage cell walls which defines the cells is welded to a common baseplate which serves to provide the support surface for the upwardly extending vertical storage cells and stored nuclear fuel therein.

Fuel racks used to store multiple spent nuclear fuel assemblies hold them upright in the pool of water which serves to remove the generated heat, protect them against damage under seismic conditions and control reactivity. The baseplate of the fuel rack fuel is slightly elevated above the pool liner (floor or bottom slab) such that there is a water plenum underneath the rack to allow a flow cold pool water upwards through the cells and the inter-rod spaces in the fuel assemblies via natural convective thermosiphon action flow.

The cells of the fuel rack must typically incorporate provisions for reactivity control via neutron absorbing materials. The neutron absorbing material must be anchored in each cell in a manner which does not interfere with insertion and removal of fuel assemblies via handling equipment such as cranes or hoists.

Improvements in fuel racks for wet storage of nuclear fuel assemblies are desired which allow anchoring of intra-cell neutron absorbing materials to meet the foregoing requirements.

SUMMARY

The present disclosure provides nuclear fuel storage system comprising a device for reactivity mitigation usable in fuel racks suitable for wet storage of nuclear fuel in a spent fuel pool of a nuclear facility. The present device comprises neutron absorber inserts each of which can be readily anchored to the fuel rack and secured in each cell without interfering with the insertion or removal of fuel assemblies from the cells. For existing fuel racks in use which are suffering a reduction of reactivity control due to degradation of original neutron absorber materials after prolonged use, the present neutron absorber insert advantageously provides a robust and economical alternative to moderate fuel reactivity which can be implemented and installed on a relatively expedited schedule, without replacing or structurally modifying the existing racks. Boraflex is one such previously used neutron absorber material known to suffer degradation after prolonged use in spent fuel storage pools due to gamma radiation exposure, shrinkage, and silica release resulting in an increase in fuel rack reactivity.

Installing and retrofitting the present neutron absorber inserts in existing fuel storage racks using the insert securement system disclosed herein allows a nuclear generating plant to recover the criticality safety margins lost due to neutron absorber degradation or the enhanced reactivity of fuel following a power uprate of the reactor. The present insert serves to replace or augment the neutron attenuation function of the existing racks.

In one embodiment, the neutron absorber inserts may comprise a discontinuously reinforced aluminum boron carbide metal matrix composite material designed for neutron radiation shielding such as METAMIC® available from Holtec International of Camden, New Jersey as the primary material of construction. The utilization of METAMIC®, which contains boron, as the neutron absorber will ensure criticality control and continued high margins of safety.

In one embodiment, the present neutron absorber inserts are configured for particular use with a certain style of boiling water reactor (BWR) spent nuclear fuel rack which utilizes a support ring at the bottom of each cell which supports a BWR-style nuclear fuel assembly, as further described herein. The neutron absorber insert may be configured and operable for securement directly to the support ring in certain embodiments and extends for a majority of the height of the cell to at least cover the “active fuel region” of the fuel rack. The absorber insert therefore does not lock into or couple to the existing cell wall structure of the fuel rack unlike prior inserts.

Each neutron absorber insert according to the present disclosure may comprise at least one neutron absorber plate having an elongated body which occupies the intra-cell space or gap between the fuel assembly and cell walls. In some embodiments, a chevron shaped absorber plate comprising a pair of angled walls may be provided. The walls may be perpendicularly oriented to each other. In other yet embodiments, a tubular absorber insert may be provided which comprises four walls. The fuel assembly storage cells of the fuel rack therefore may be square in cross-sectional shape in some embodiments.

In one aspect, a fuel rack with reactivity control for storing spent nuclear fuel, the fuel rack comprising: a baseplate; and a cellular body extending vertically from the baseplate and comprising a plurality of cell walls, the cell walls defining a plurality of open cells each configured to store a nuclear fuel assembly therein; the baseplate further comprising a raised fuel assembly support ring disposed at the bottom of each cell; and a neutron absorber insert disposed in at least one cell the neutron absorber insert comprising a top end and a bottom end configured to frictionally engage the support ring in the at least one cell to secure the neutron absorber insert therein.

In another aspect, a neutron absorber insert for a fuel rack used for wet storage of nuclear fuel, the neutron absorber insert comprising: a neutron absorber plate including a top end and a bottom end, the neutron absorber plate configured for insertion in a fuel storage cell of the fuel rack which is configured for receiving a nuclear fuel assembly therein; and a plurality of resiliently deformable locking protrusions disposed on the bottom end of the neutron absorber plate, the locking protrusions operable to frictionally engage a raised fuel assembly support ring disposed on the fuel rack at a bottom of the fuel storage cell.

In another aspect, a method of installing a reactivity control device in a fuel assembly storage cell of a nuclear fuel rack comprises: inserting a neutron absorber insert into the storage cell; and frictionally engaging a bottom end of the neutron absorber insert with a raised fuel assembly support ring of the fuel rack disposed at a bottom of the storage cell. The frictionally engaging step may include frictionally engaging a plurality of resiliently deformable radial locking protrusions formed on the bottom end of the neutron absorber insert with the support ring to lock the neutron absorber insert thereto.

BRIEF DESCRIPTION OF THE DRAWINGS

The features of the exemplary embodiments will be described with reference to the following drawings where like elements are labeled similarly, and in which.

Figure 1:
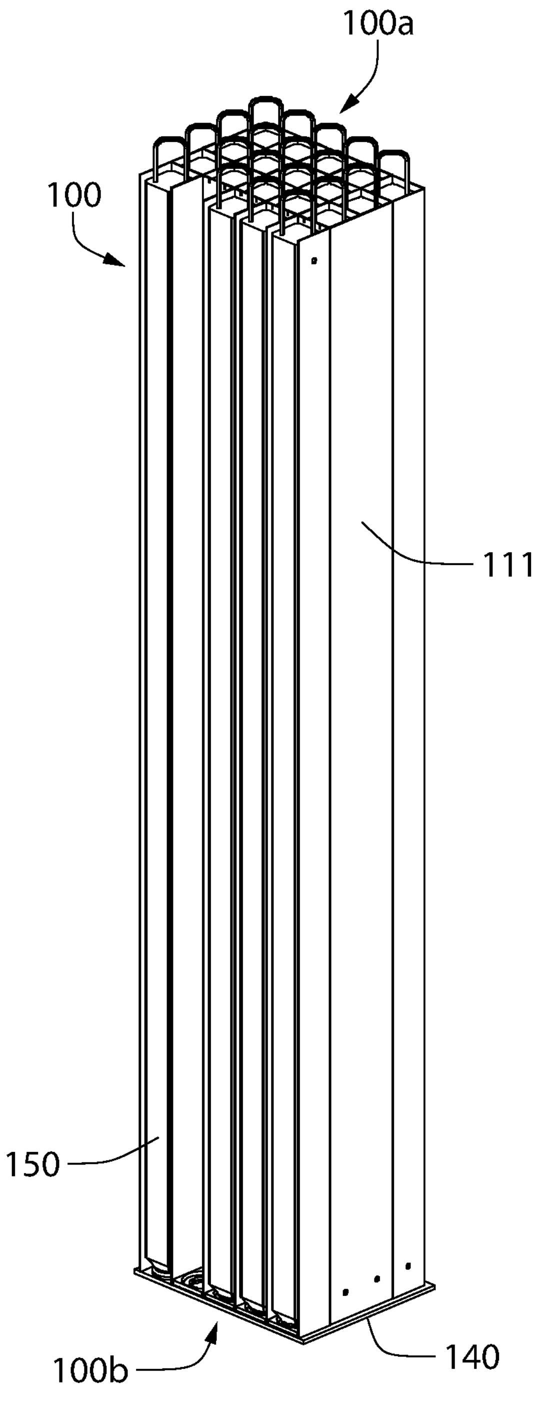
FIG. 1 is top perspective view of a nuclear fuel rack for wet storage of nuclear fuel comprising neutron absorber inserts according to the present disclosure.
Figure 2:
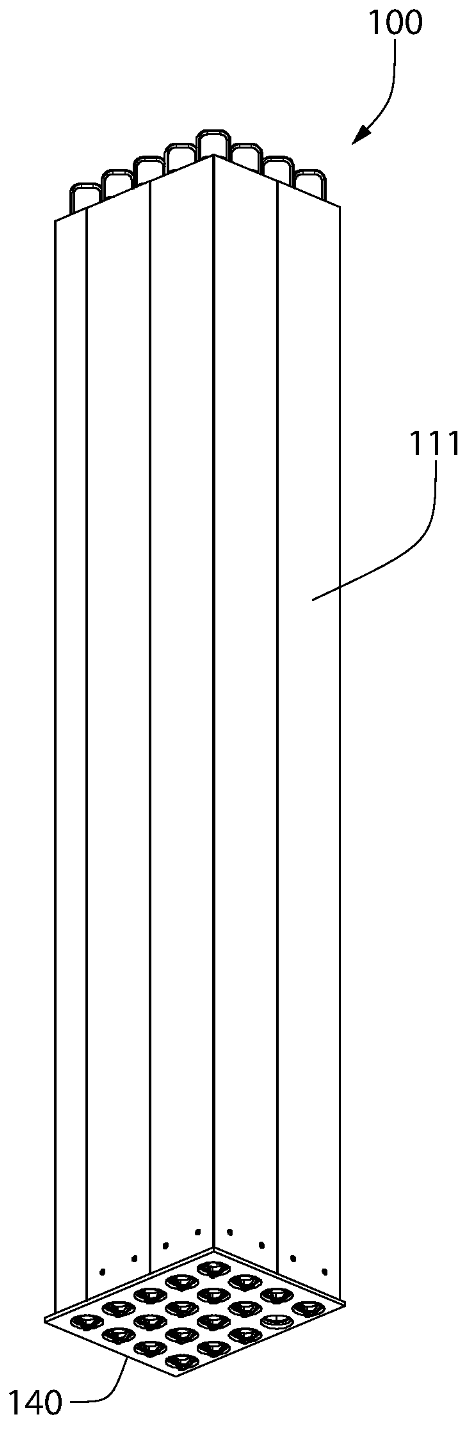
FIG. 2 is a bottom perspective view of the fuel rack.
Figure 3:
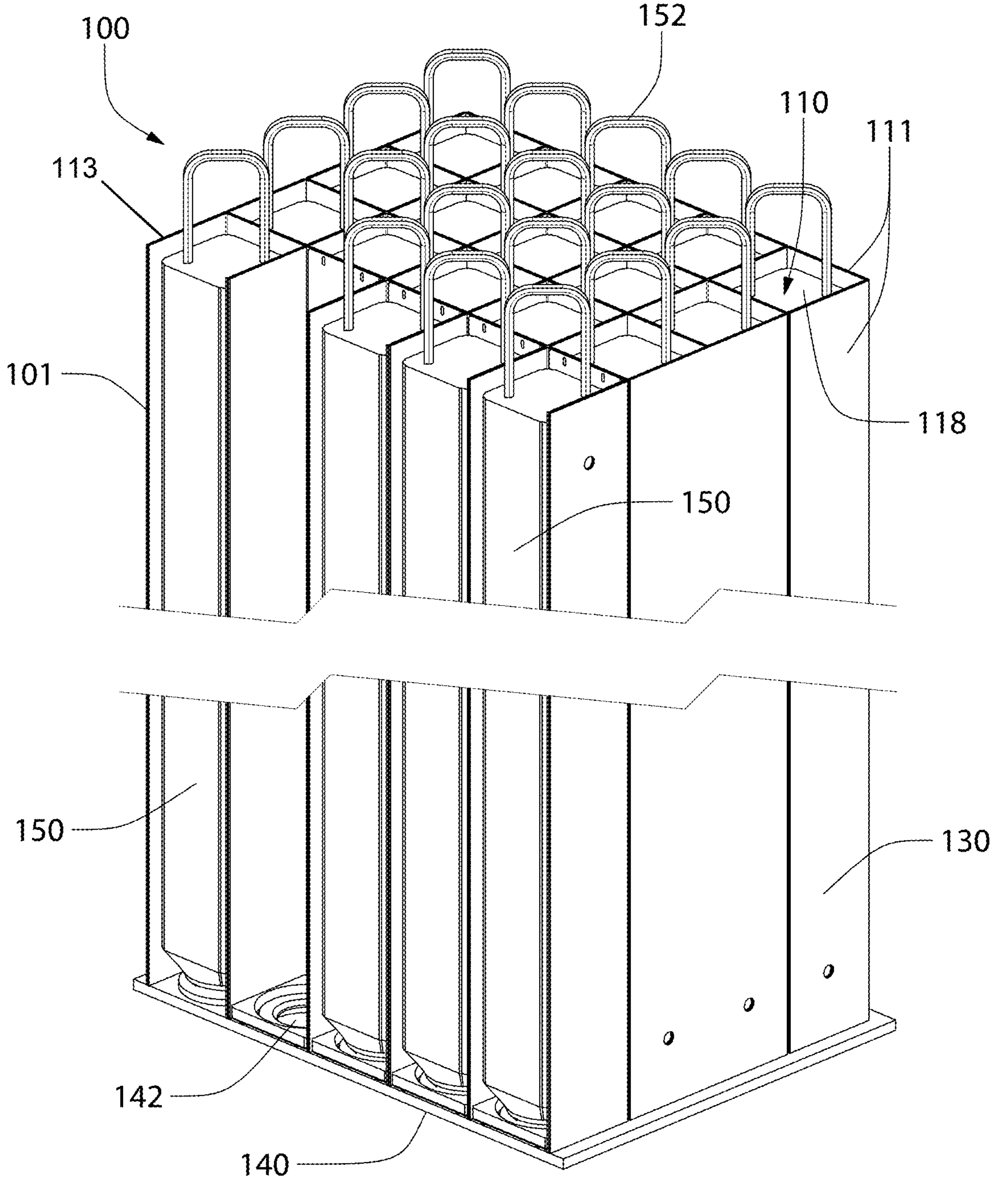
FIG. 3 is an enlarged top perspective view of the fuel rack.
Figure 4:
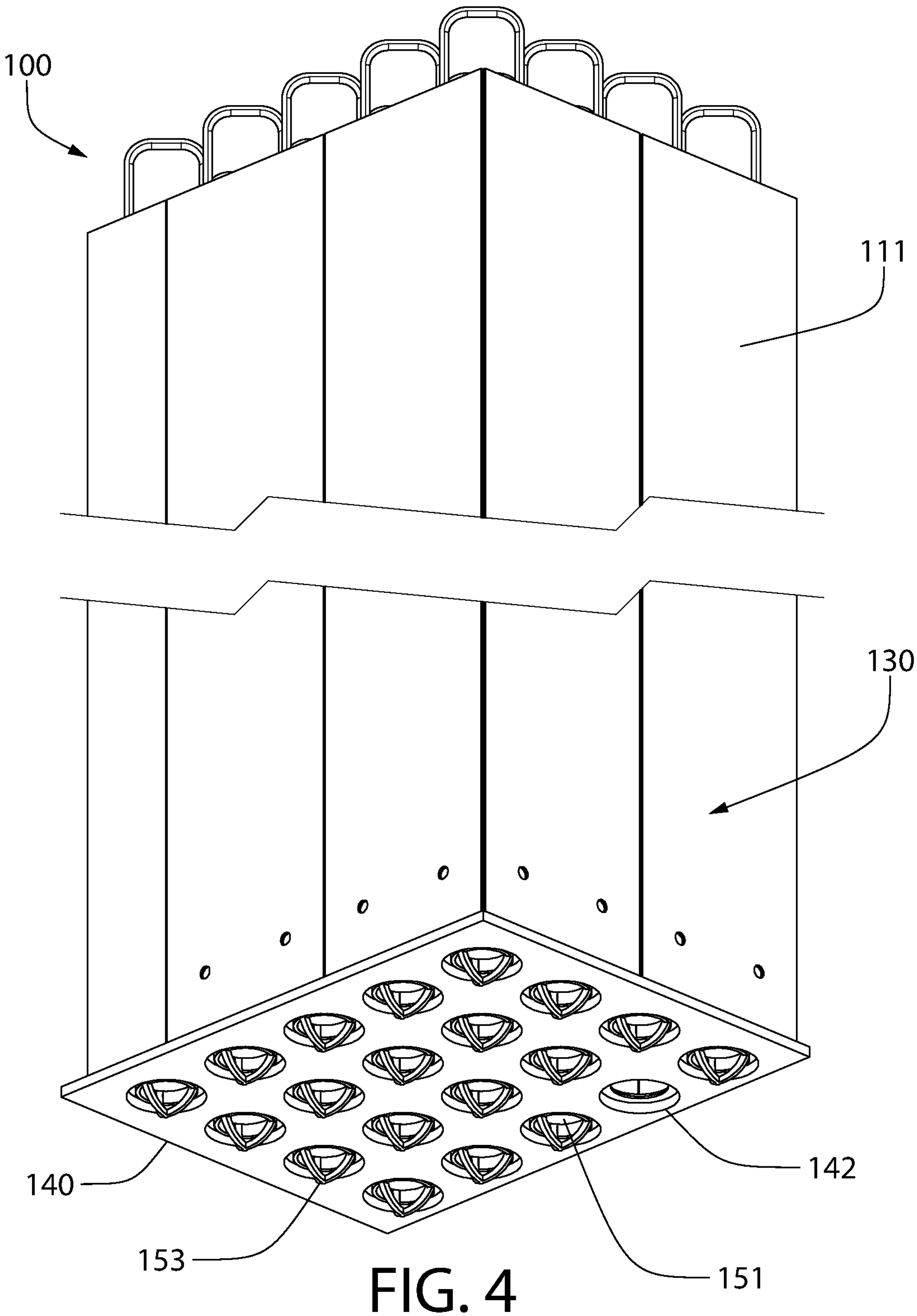
FIG. 4 is an enlarged bottom perspective view of the fuel rack.
Figure 5:
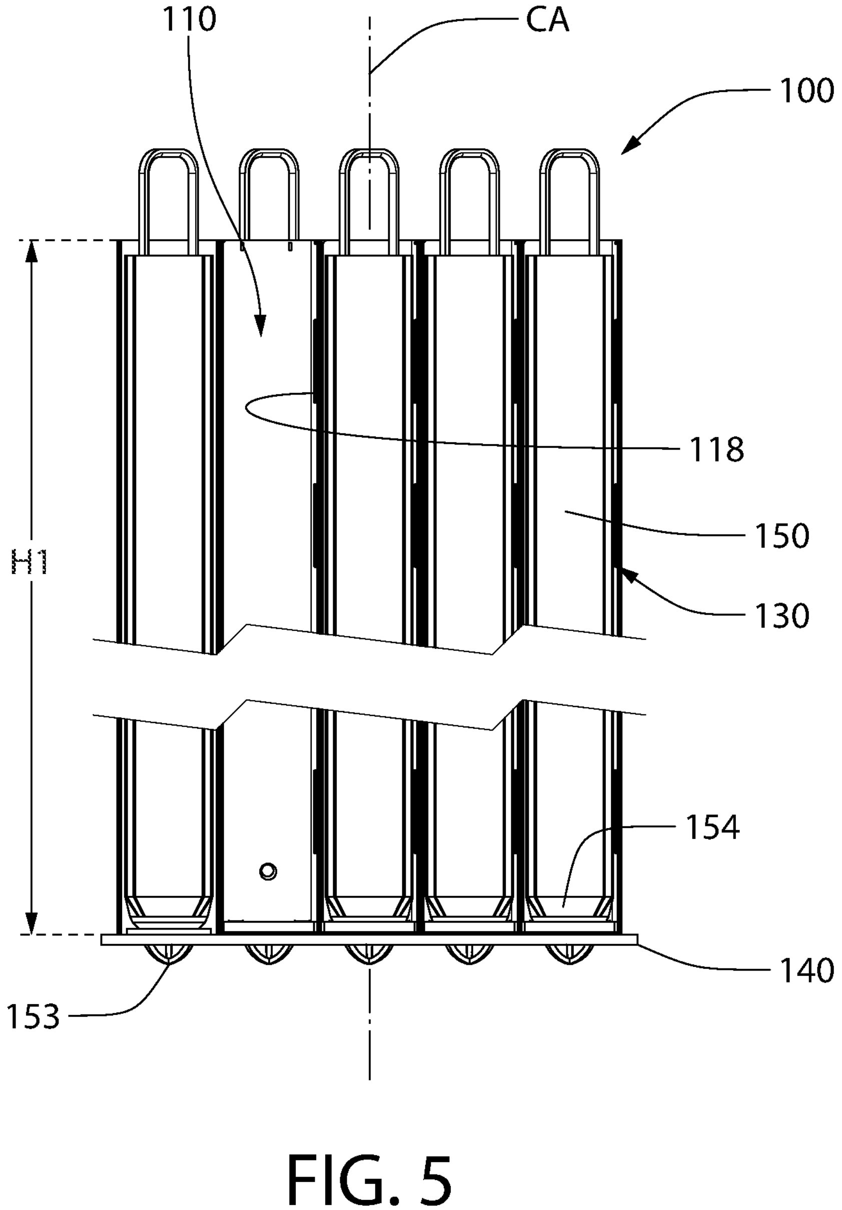
FIG. 5 is a side view of the fuel rack with outer lateral cell wall plates removed to reveal nuclear fuel assembly houses therein (one storage cell being empty)
Figure 6:
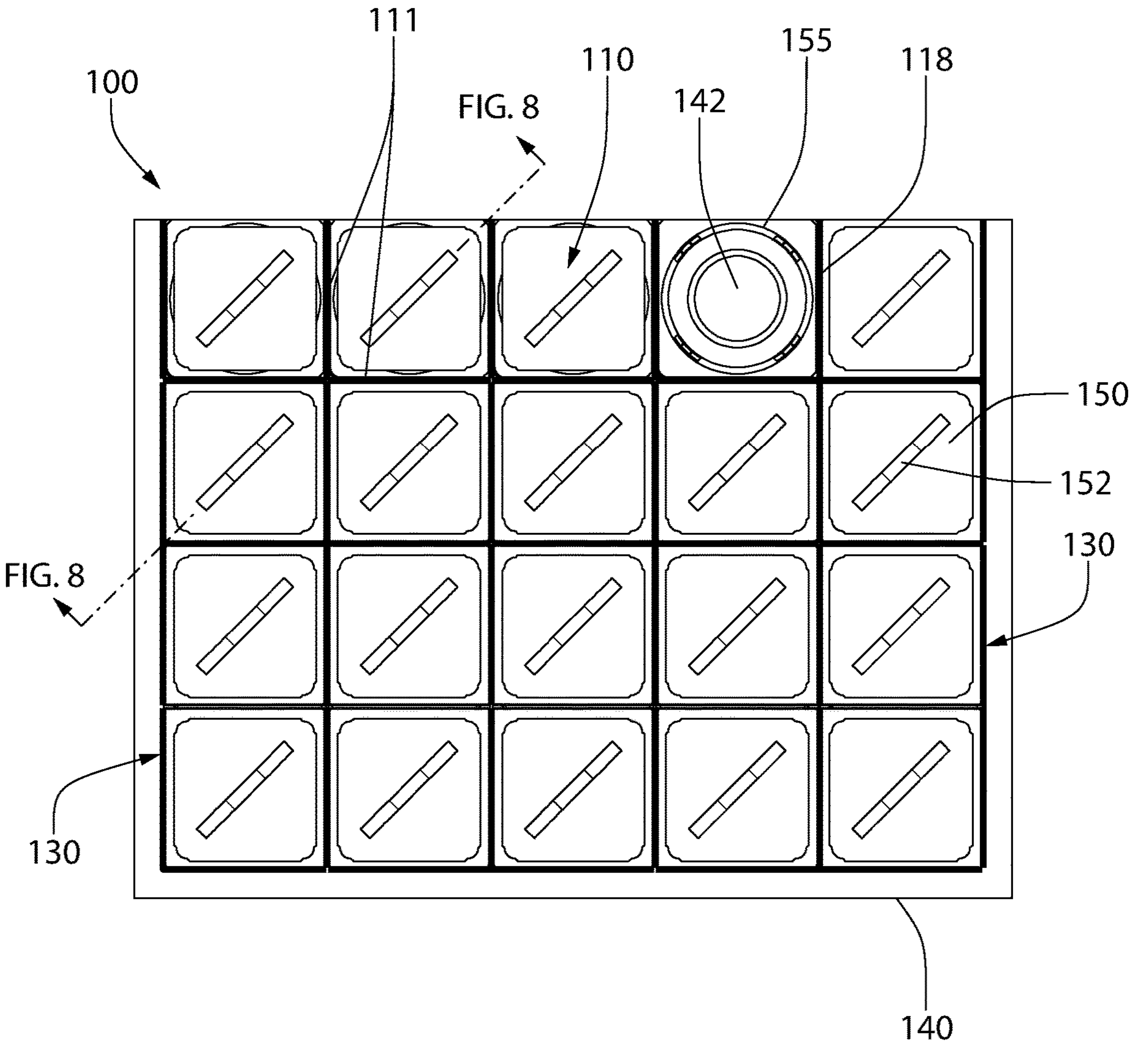
FIG. 6 is a top view of the fuel rack.
Figure 7:
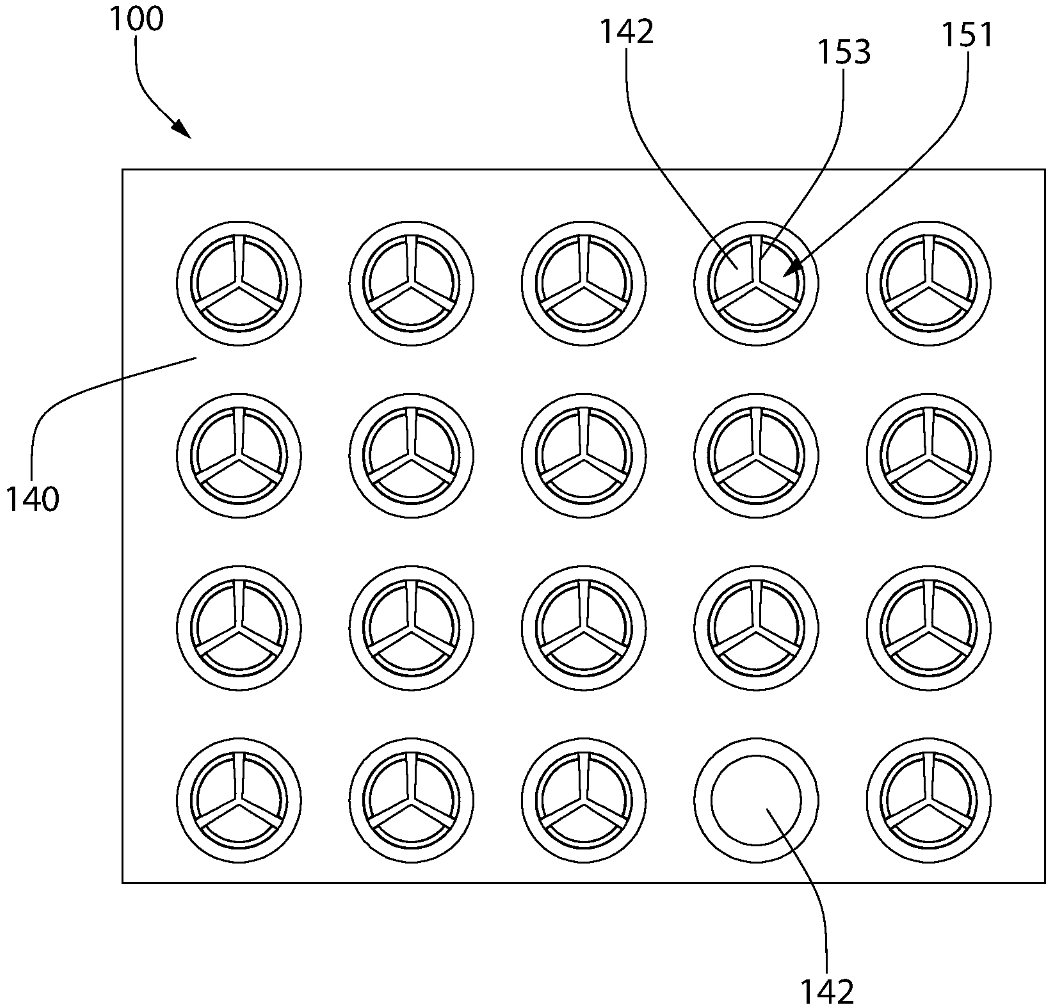
FIG. 7 is a bottom view of the fuel rack.
Figure 8:
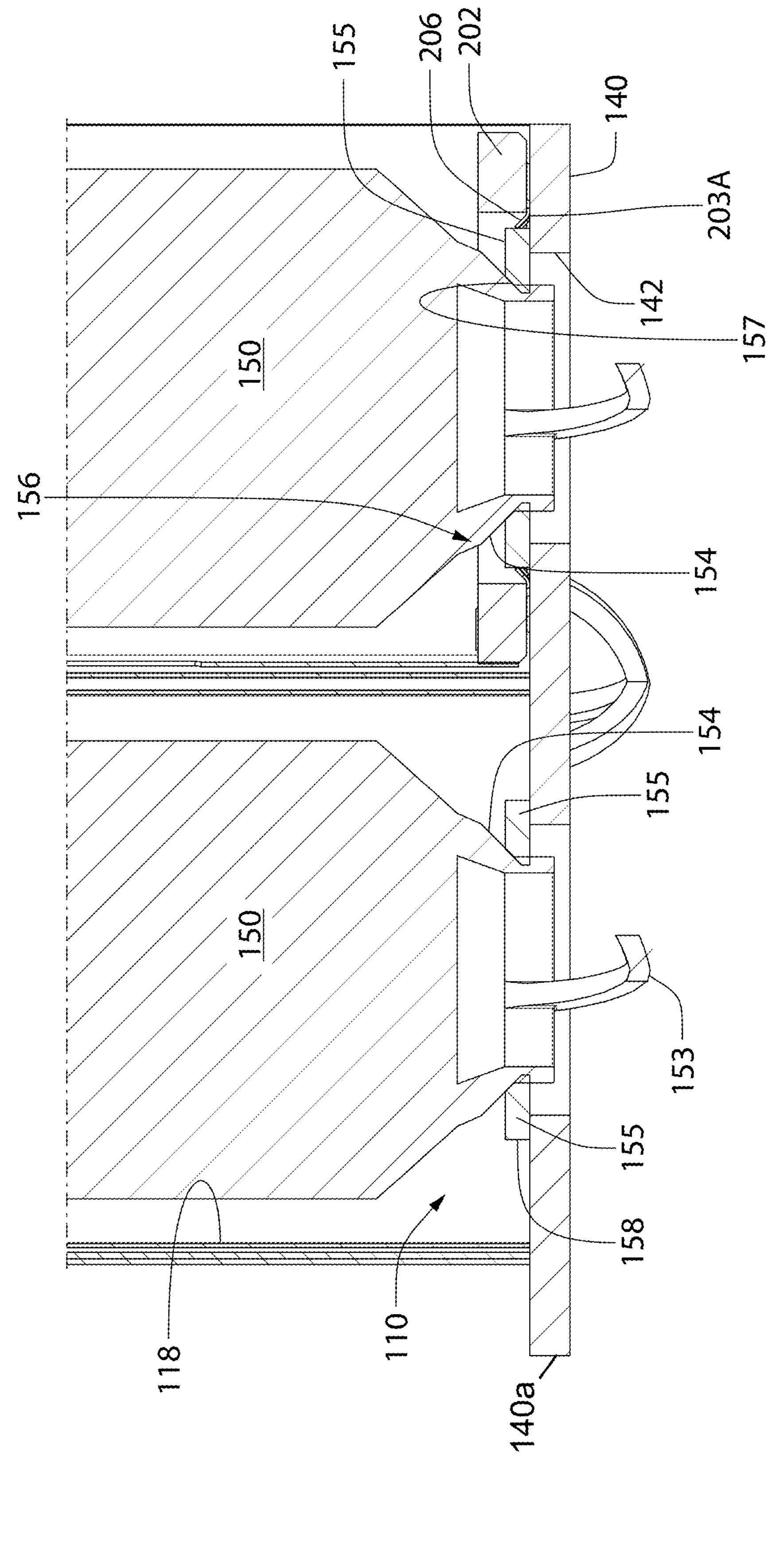
FIG. 8 is a transverse cross-sectional view of a portion of the fuel rack taken from FIG. 6 showing the fuel assembly and raised support ring interface at the bottom of the cells in the rack.
Figure 9:
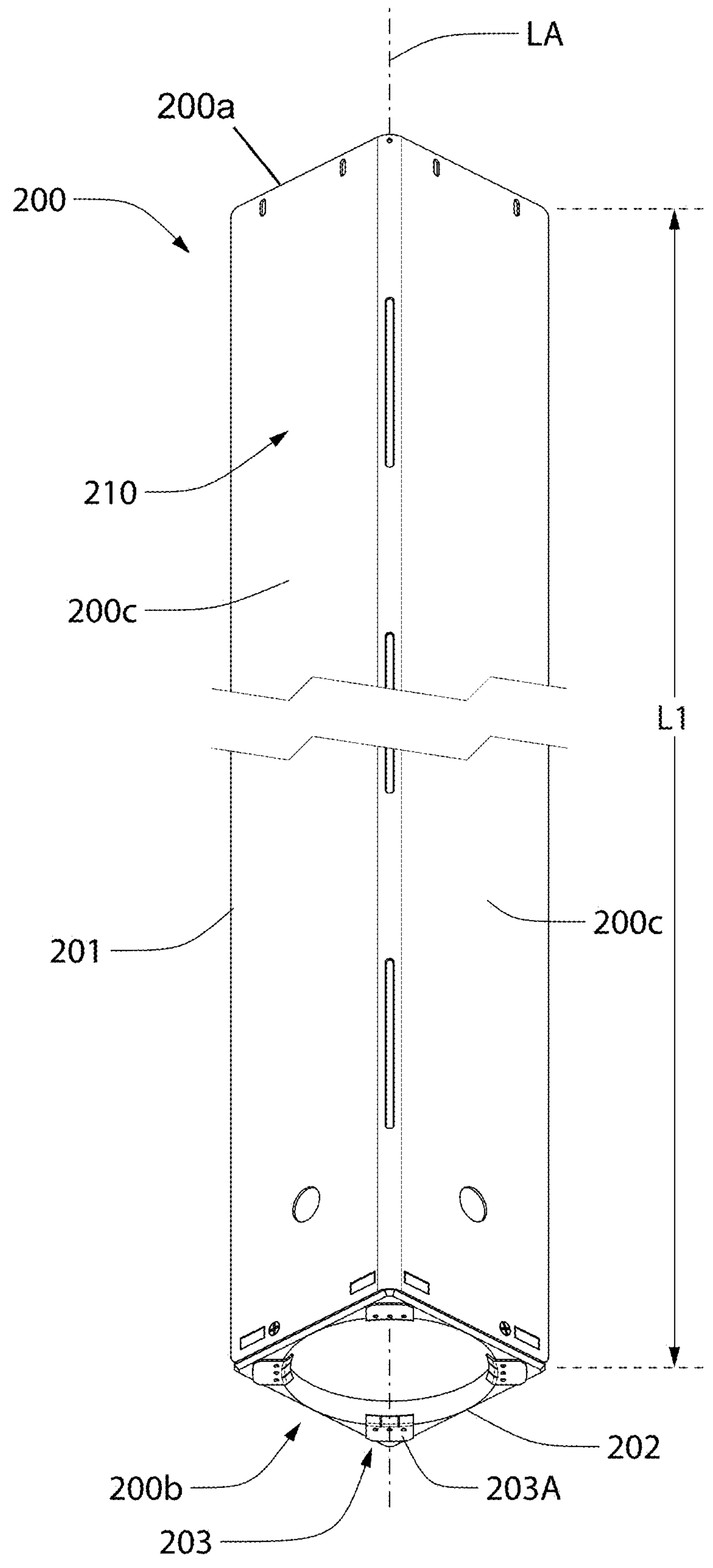
FIG. 9 is a bottom perspective view of a neutron absorber insert insertable into a fuel assembly storage cell of the fuel rack.
Figure 10:
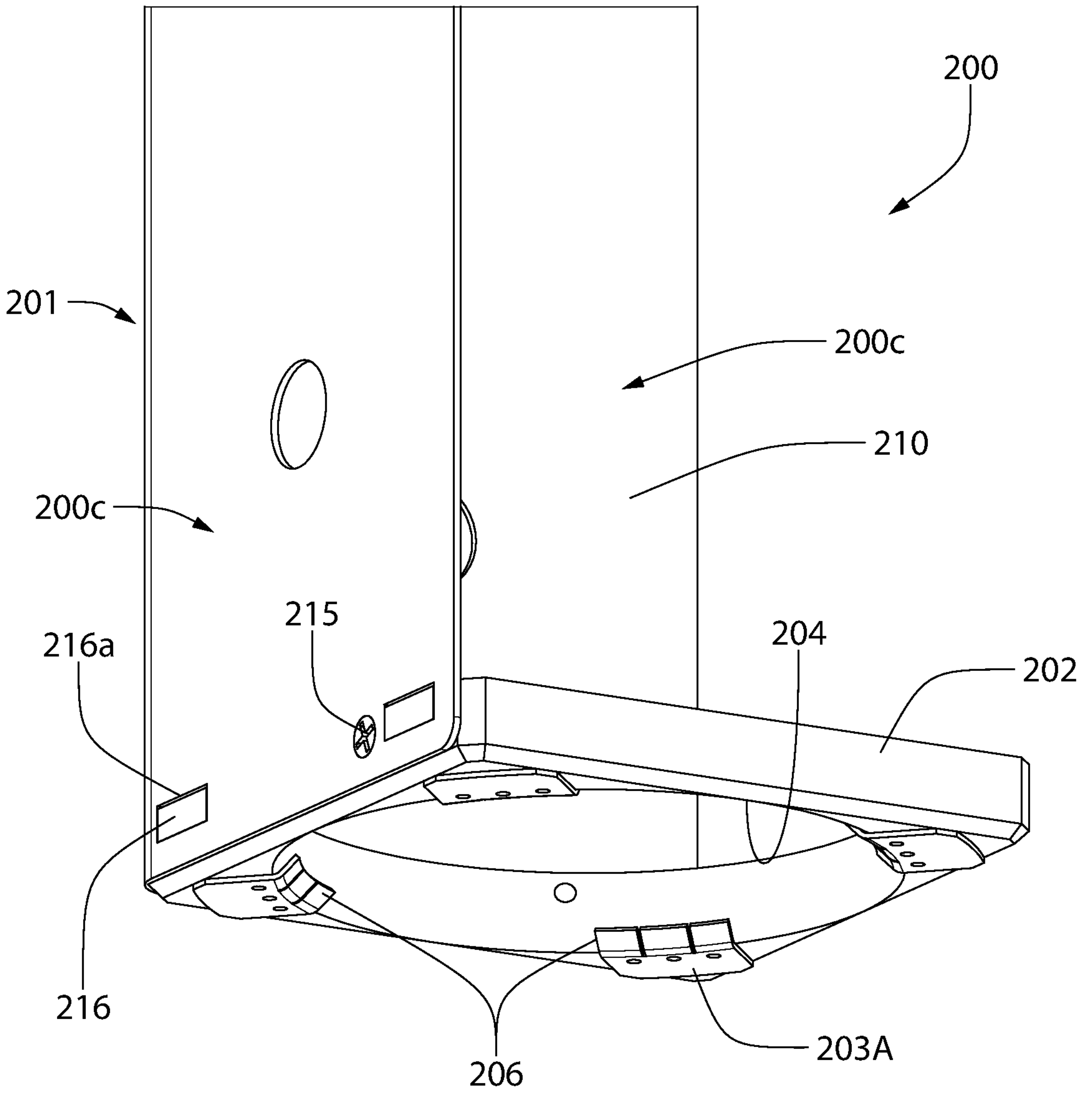
FIG. 10 is an enlarged view of the bottom of the neutron absorber insert showing the attachment plate and locking plate assembly.
Figure 11:
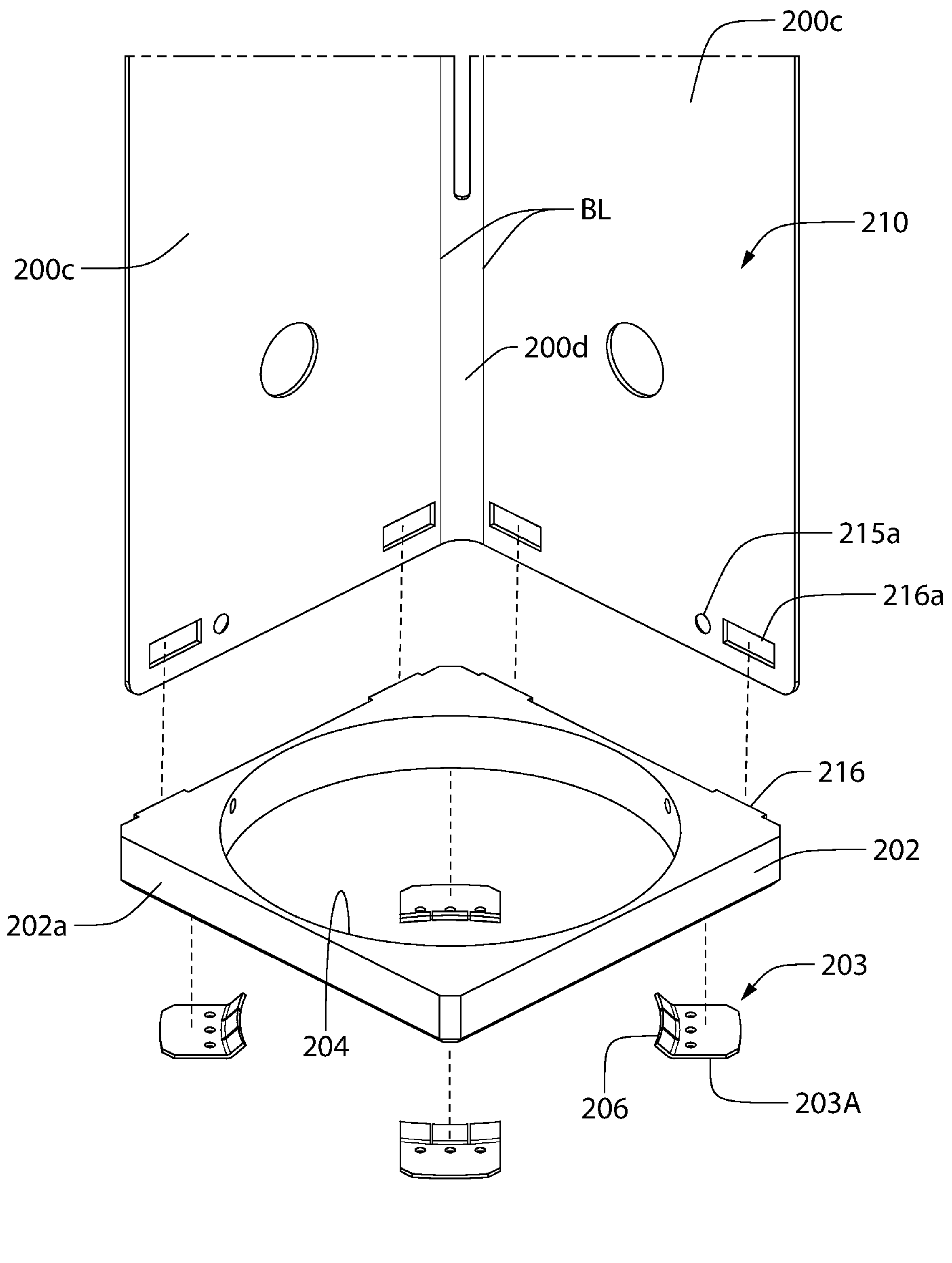
FIG. 11 is a top exploded perspective view thereof.
Figure 12:
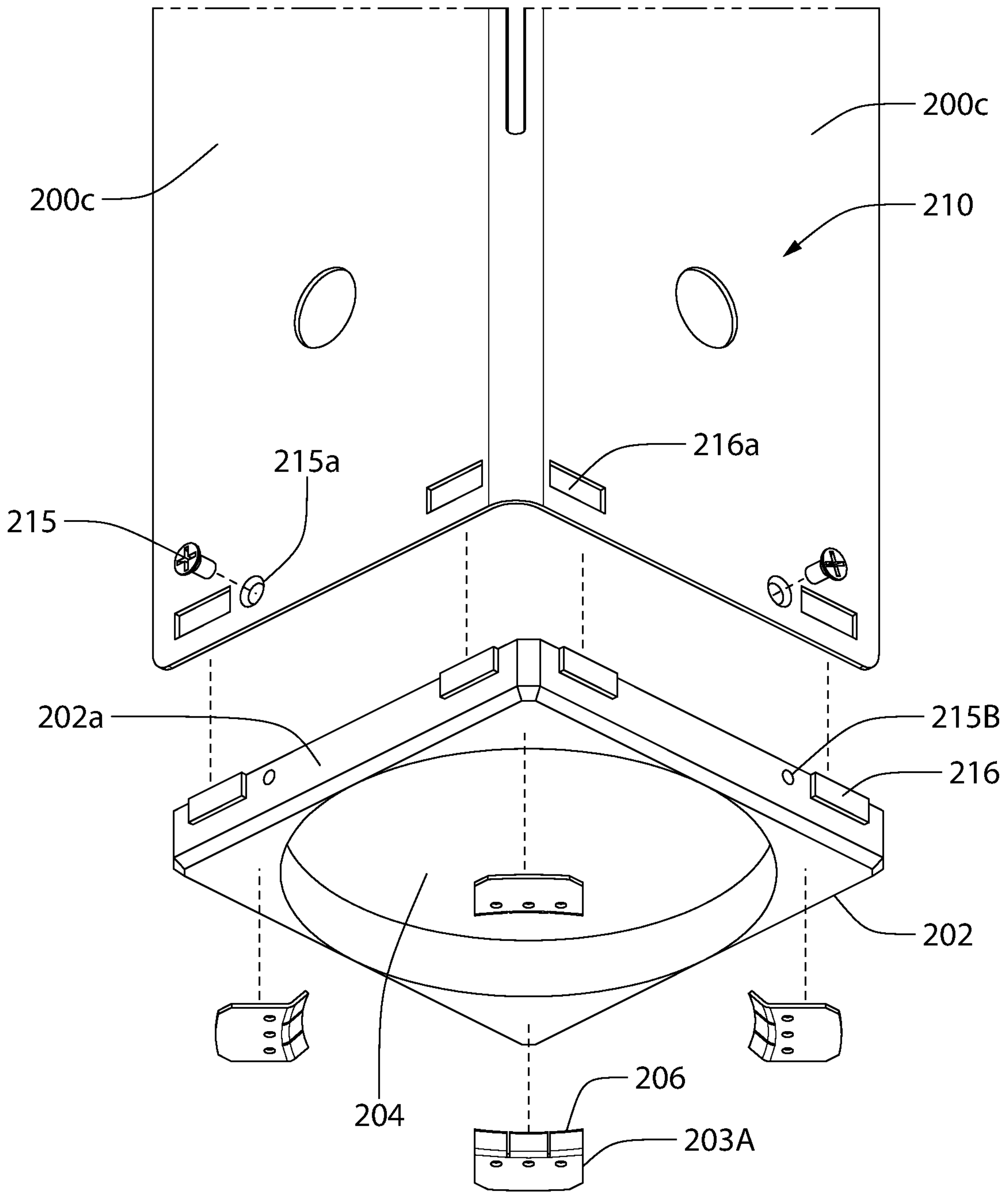
FIG. 12 is a bottom exploded perspective view thereof.
Figure 13:
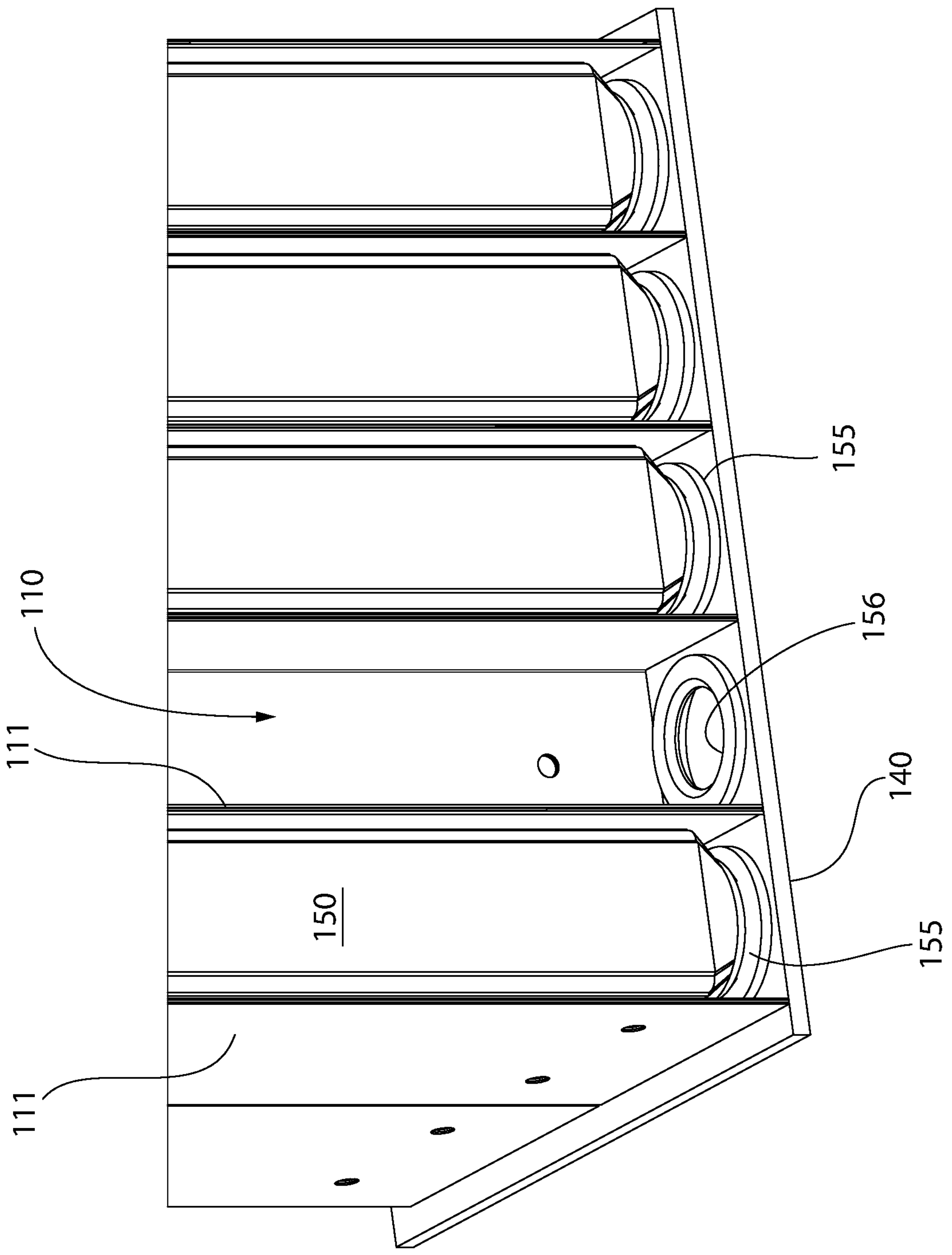
FIG. 13 is a top perspective view of the fuel rack as shown in FIG. 5.
Figure 14:
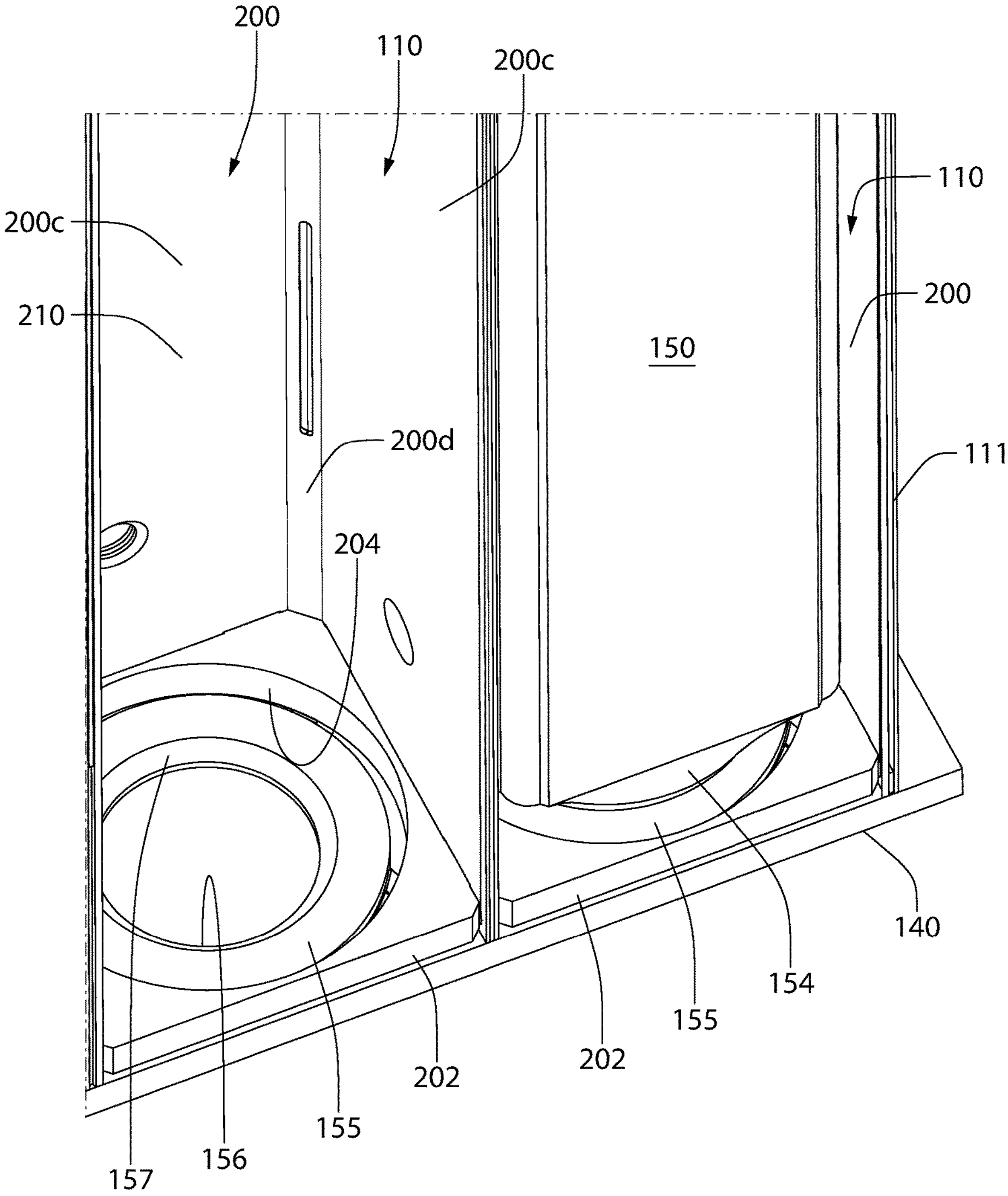
FIG. 14 is an enlarged portion of FIG. 13 showing two storage cells of the fuel rack (one with and one without a fuel assembly mounted therein)
Figure 15:
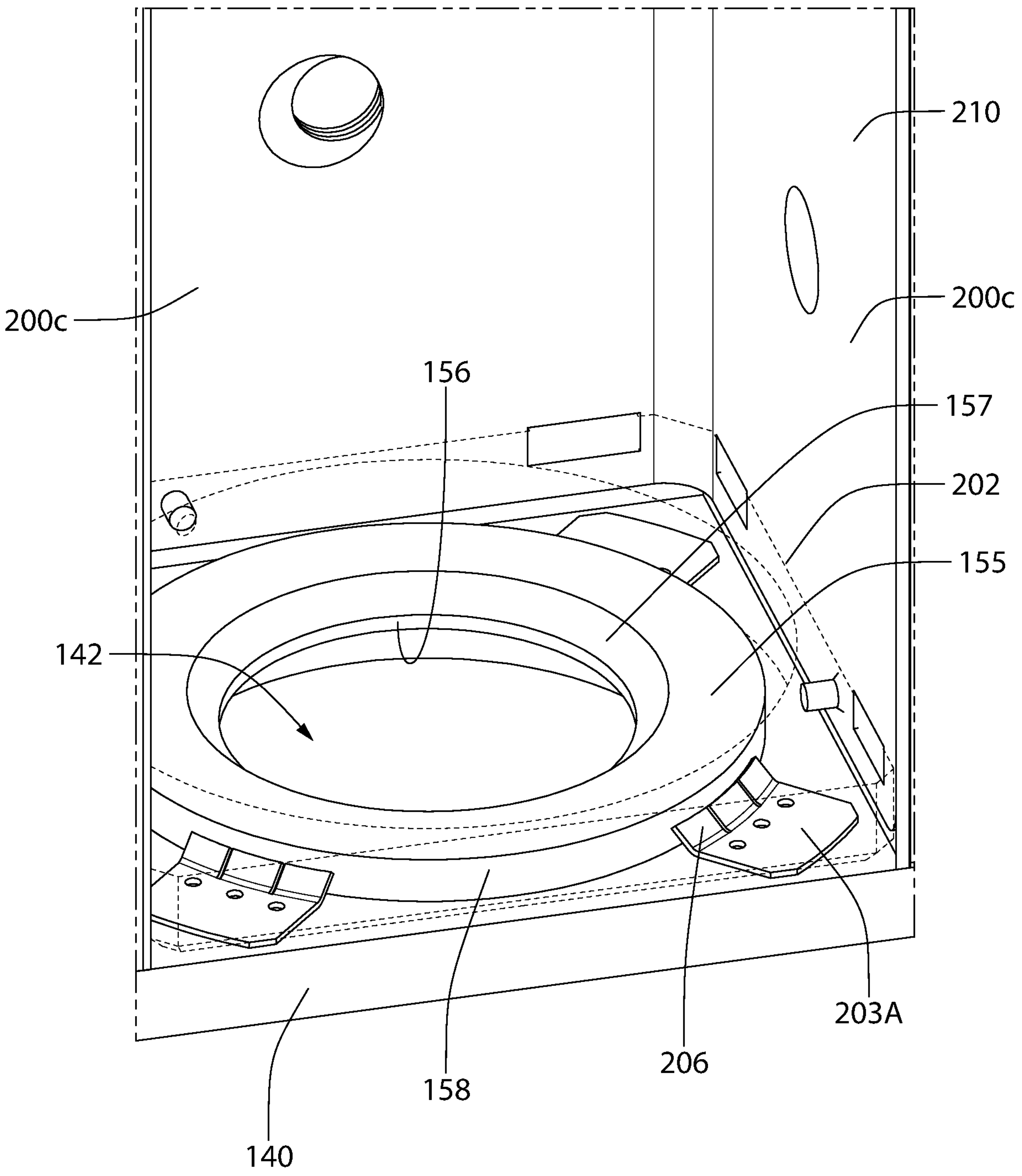
FIG. 15 is an enlarged top perspective view of the empty storage cell of the rack in FIG. 14 showing plural locking plates with angle radial locking protrusions frictionally engaging the sides of the fuel assembly support ring on the baseplate (attachment plate being shown in phantom dashed lines for clarity of depiction)

All drawings are schematic and not necessarily to scale. Parts shown and/or given a reference numerical designation in one figure may be considered to be the same parts where they appear in other figures without a numerical designation for brevity unless specifically labeled with a different part number and described herein. A reference herein to a figure by number but which includes multiple figures sharing the same number with different alphabetical suffixes shall be considered to all of those figures unless noted otherwise.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features. Furthermore, all features and designs disclosed herein may be used in combination even if not explicitly described as such.

In the description of embodiments disclosed herein, any reference to direction or orientation is merely intended for convenience of description and is not intended in any way to limit the scope of the present invention. Relative terms such as “lower,” “upper,” “horizontal,” “vertical,”, “above,” “below,” “up,” “down,” “top” and “bottom” as well as derivative thereof (e.g., “horizontally,” “downwardly,” “upwardly,” etc.) should be construed to refer to the orientation as then described or as shown in the drawing under discussion. These relative terms are for convenience of description only and do not require that the apparatus be constructed or operated in a particular orientation. Terms such as “attached,” “affixed,” “connected,” “coupled,” “interconnected,” and similar refer to a relationship wherein structures are secured or attached to one another either directly or indirectly through intervening structures, as well as both movable or rigid attachments or relationships, unless expressly described otherwise. It will be appreciated that any numerical ranges that may be described herein shall be understood to include the lower and upper numerical terminus values or limits of the cited range, and any numerical values included in the cited range may serve as the terminus values.

Figure 20:
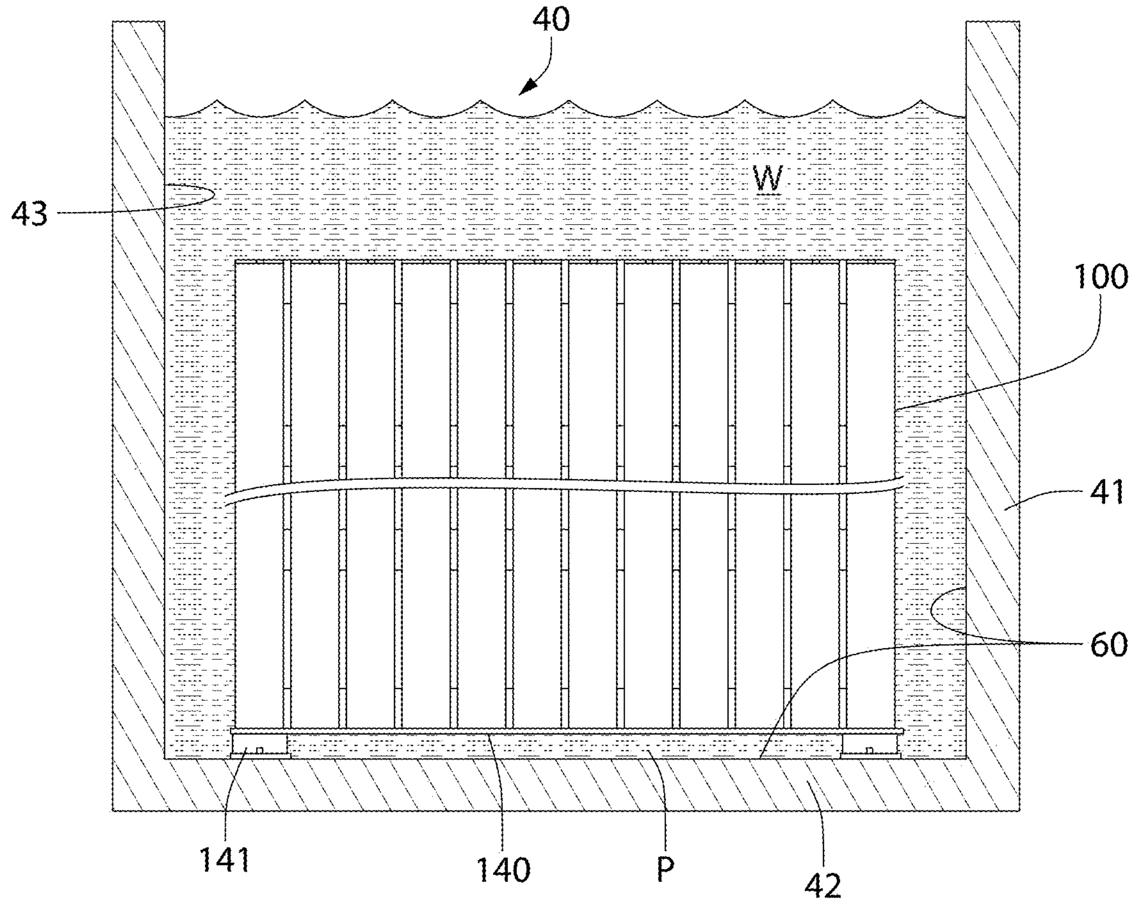
FIG. 20 is a side view of a spent nuclear fuel pool containing a submerged nuclear fuel rack with the neutron absorber inserts according to the present disclosure.

Referring initially to FIG. 20, a nuclear facility which may be a nuclear generating plant includes a water-impounded spent fuel pool 40 according to the present disclosure configured for wet storage of nuclear fuel such as in individual nuclear fuel racks 100. The fuel pool 40 comprise a plurality of vertical sidewalls 41 rising upwards from an adjoining substantially horizontal bottom floor wall or slab 42 (recognizing that some slope may intentionally be provided in the upper surface of the floor slab for drainage toward a low point if the pool is to be emptied and rinsed/decontaminated at some time and due to installation tolerances). The floor slab 42 and sidewalls 41 may be formed of reinforced concrete in one non-limiting embodiment. The fuel pool floor slab 42 may be formed in and rest on soil or engineered fill. The floor slab 42 may be located at grade, below grade, or elevated above grade. In some embodiments contemplated, the floor slab 42 and sidewalls 41 may be at least partially in which soil and/or engineered fill surrounds the outer surfaces of the sidewalls. Any of the foregoing arrangements or others may be used depending on the layout of the nuclear facility and does not limit of the invention.

In one embodiment, the fuel pool 40 may have a rectilinear shape in top plan view. Four sidewalls 41 may be provided in which the pool has an elongated rectangular shape (in top plan view) with two longer opposing sidewalls and two shorter opposing sidewalls (e.g. end walls). Other configurations of the fuel pool 40 are possible such as square shapes, other polygonal shapes, and non-polygonal shapes.

Figure 16:
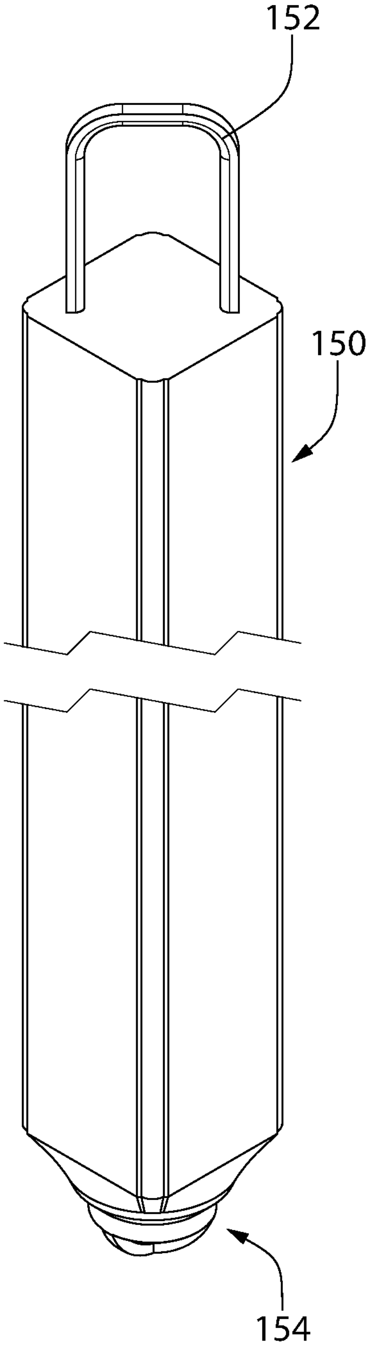
FIG. 16 is a top perspective view of one of the fuel assemblies insertable into one of the storage cells of the fuel rack.
Figure 17:
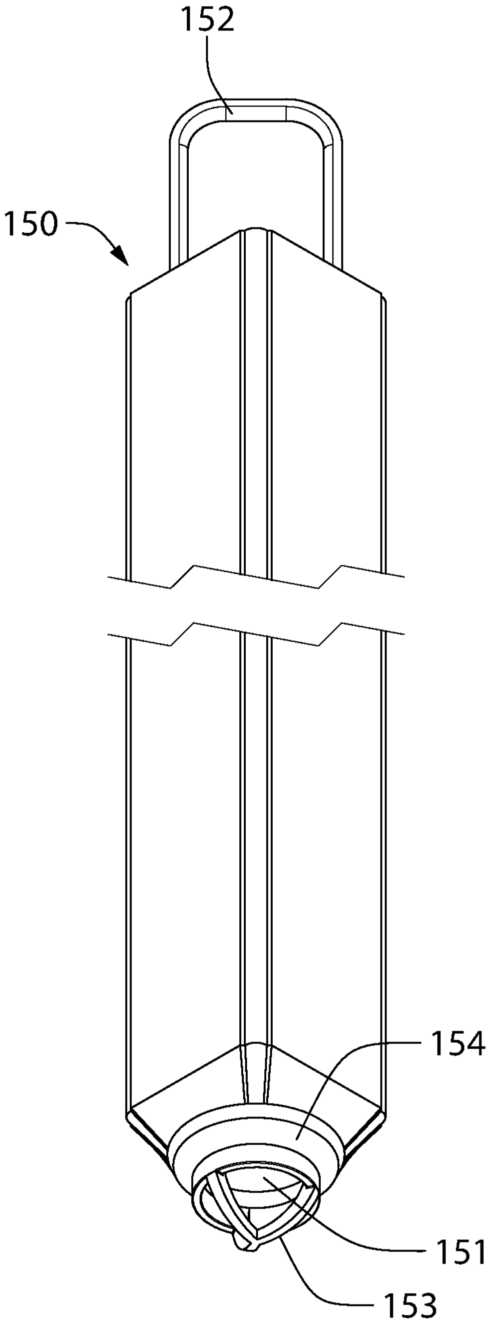
FIG. 17 is a bottom perspective view thereof.

The sidewalls 41 and floor slab 42 of the fuel pool 40 define an upwardly open well or cavity 43 configured to hold cooling pool water W and the plurality of submerged nuclear fuel racks 100 each holding multiple nuclear fuel bundles or assemblies 150 (see, e.g., FIGS. 13-14 and 16-17). Each fuel assembly 150 in turn contains multiple individual spent uranium fuel rods. The fuel assemblies may each have a generally rectangular cuboid configuration (except for the conical bottoms) as shown in FIGS. 16-17. This is typical for some Boiling Water Reactor fuel assemblies as further described herein. The fuel racks 100 storing the fuel assemblies are emplaced on the floor slab 42 in a high-density arrangement in the horizontally-abutting manner.

In some embodiments, a fuel pool liner system may be provided to minimize the risk of pool water leakage to the environment. The liner system may include cooling water leakage collection and detection/monitoring to indicate a leakage condition caused by a breach in the integrity of the liner system. Liner systems are further described in commonly owned U.S. patent application Ser. No. 14/877,217 filed Oct. 7, 2015, which is incorporated herein by reference in its entirety.

The liner system in one embodiment may comprise one or more liners 60 attached to the inner surfaces of the fuel pool sidewalls 41 and the floor slab 42. The inside surface of liner is contacted and wetted by the fuel pool water W. The liner 60 may be made of any suitable metal of suitable thickness which is preferably resistant to corrosion, including for example without limitation stainless steel, or other. Typical liner thicknesses may range from about and including 3/16 inch to 5/16 inch thick. Typical stainless steel liner plates include ASTM 240-304 or 304L.

In some embodiments, the liner 60 may be comprised of multiple substantially flat metal plates or sections which are hermetically seal welded together via seal welds along their contiguous peripheral edges to form a continuous liner system completely encapsulating the sidewalls 41 and floor slab 42 of the fuel pool 40 and impervious to the egress of pool water W. The liner 60 extends around and along the vertical sidewalls 41 of the fuel pool 40 and completely across the horizontal floor slab 42 to completely cover the wetted surface area of the pool. This forms horizontal sections and vertical sections of the liner to provide an impervious barrier to out-leakage of pool water W from fuel pool 40. The horizontal sections of liners 60 on the floor slab 42 may be joined to the vertical sections along perimeter corner seams therebetween by hermetic seal welding. The liner 60 may be fixedly secured to the floor slab 42 and sidewalls 41 of the fuel pool 40 by any suitable method such as threaded or other fasteners.

FIGS. 1-8 and 20 show one example of a nuclear fuel rack 100 usable with embodiments of the present neutron absorber inserts 200 according to the present disclosure and various features/details thereof. Fuel rack 100 is a cellular vertically upright module or unit comprising a vertically-extending cellular body 101 and a horizontal baseplate 140 which supports the body. Fuel rack 100 comprises a top 100*a*, opposite bottom 100*b*, and plurality of lateral sides 130 extending vertically therebetween. Baseplate 140 is configured to support the fuel rack from the floor slab 42 of fuel pool 40, as further described herein.

Fuel rack 100 may be a high density, tightly packed type rack, which in one embodiment as illustrated is designed to store a plurality of spent nuclear fuel assemblies 150 and accommodate radiation amelioration/reactivity control provisions according to the present disclosure such as neutron absorber insert 200, further described herein.

Each fuel rack 100 defines a vertical centerline axis CA which passes through the geometric center of the rack. The cellular body 101 of fuel rack 100 defines a fuel storage region of the rack, which comprises a grid array of closely packed and vertically elongated upwardly open cells 110 each defined and circumscribed by a plurality of angled cell walls 111. Cells 110 define an open top for insertion of a single fuel assembly 150 in each cell. Accordingly, each cell is configured in cross-sectional area designed to accommodate only a single fuel assembly 150. Adjacent pairs of cells walls of each cell 110 meet perpendicularly at a 90 degree angled corner. Each fuel storage cell 110 therefore includes a plurality of corners. Cells 110 in one non-limiting embodiment may have a rectilinear configuration and transverse cross section such as square, as shown.

In one embodiment, the cell walls 111 which define cells 110 may each be formed by a plurality of orthogonally arranged and vertically elongated corrosion resistant metal plates rigidly coupled at their bottom ends to the top surface of the baseplate 140 such as via welding. Stainless steel plates may be used in one embodiment. The fuel storage cells 110 defined by the wall plates are arranged in parallel axial relationship to each other along vertical centerline axis CA.

In other possible embodiments and alternate constructions, the cells 110 of the fuel rack 100 may instead be formed by a plurality of parallel vertical metal tubes (not shown) welded at their bottom ends to the top of baseplate 140. Such tubular fuel rack cell structures are well known in the art and shown for example in commonly-owned U.S. patent application Ser. No. 14/367,705, which is incorporated herein by reference in its entirety. In other possible embodiments, the fuel storage cells 110 may be formed using an egg crate construction method comprising a plurality of orthogonally interlocked slotted plates as disclosed in commonly-owned U.S. Pat. No. 10,650,933, which is incorporated herein by reference in its entirety.

Accordingly, any number and manner of fabrication techniques may be used to define the fuel storage cells 110 of illustrated fuel rack 100 which are all usable with the present invention. The manner in which the cells are formed therefore does not limit the present reactivity control device such as neutron absorber inserts 200 disclosed herein or their use. Furthermore, the present neutron absorber inserts may be used in fuel racks with or without flux traps (e.g., spent fuel pool filled spaces between adjacent cells) so long as the inserts can be anchored in each cell.

The fuel rack 100 comprises peripherally arranged outboard cells 110 which define a perimeter of the fuel rack and inboard cells located between the outboard cells. The outward facing cell walls 111 of the perimetrically arranged outboard cells collectively define the four lateral sides 130 of each fuel rack 100.

Baseplate 140 comprises a flat planar body which may be rectilinear (i.e. square or rectangular) in configuration. The baseplate defines four peripheral edges or sides 140*a* which collectively define the perimeter of the baseplate. The peripheral sides 140*a* may be linear and straight, or have some other configuration. Baseplate 140 may be made of a similar or different corrosion resistant metal as the fuel rack cell walls 111 (e.g., stainless steel) and be of suitable thickness to support the weight of the cells walls and fuel assemblies 150 when stored therein.

The baseplate of fuel rack 100 is horizontal oriented when located in the fuel pool 40 and may comprise a plurality of legs or pedestals 141 (or other structures) which support the rack from the floor slab 42 of the fuel pool 40 (see, e.g., FIG. 1). Pedestals 141 may each have a flat bottom end to engage the pool floor slab 42 and a top end fixedly attached to the bottom of baseplate 140 such as via welding. The pedestals 141 protrude downwards from baseplate 140 and are laterally spaced apart from each other and located at appropriate points on the baseplate to properly support fuel rack 100. This elevates and spaces the baseplates 140 of the rack off the floor slab 42, thereby forming a gap therebetween which defines a bottom flow plenum P beneath rack 100. The plenum P allows cooling water W in the pool to create a natural convective circulation flow path beneath the rack and enter through the bottom ends each of the cells 110.

A plurality of flow holes 142 are formed in the rack through baseplate 140 in a conventional manner to allow cooling water to flow from plenum P beneath the baseplate upwards through the cell cavity 118 of each cell 110 and then outwards through the open top ends 113 of the cells. The pool water W flowing through the cells 110 is heated by the nuclear fuel in fuel assemblies when emplaced in the cells 110, thereby creating the motive force driving the natural thermal convective flow scheme. Flow holes 142 may be circular in some embodiments.

Accordingly, flow holes 142 create passageways from below the baseplate 140 into the cells 110. Preferably, a single flow hole 142 is provided for each cell 110, however, additional holes may be used as needed to create sufficient flow through the cells to cool the fuel assemblies 150. The flow holes 142 are provided as inlets to facilitate natural thermosiphon flow of pool water through the fuel storage cells 110 when fuel assemblies emitting heat are positioned therein. More specifically, when heated fuel assemblies are positioned in the cells 110 in a submerged environment, the water within the cells surrounding the fuel assemblies becomes heated, thereby rising due to decrease in density and increased buoyancy creating a natural upflow pattern. As this heated water rises and exits the cells 110 via the cell open top ends 113, cooler water W in the fuel pool 40 is drawn into the bottom of the cells through the flow holes 142 and flows upward through the fuel assembly to cool the fuel. This heat induced water flow and circulation pattern along the fuel assemblies then continues naturally to dissipate heat generated by the fuel assemblies. Pedestals 141 may therefore have a height selected to form a bottom flow plenum P of generally commensurate height to ensure that sufficient thermally-induced circulation is created to adequately cool the fuel assembly.

In one embodiment, fuel rack 100 may be configured to hold a plurality of boiling water reactor (BWR) type fuel assemblies 150. Each fuel assembly comprises multiple fuel rods filled with uranium fuel (e.g., pellet form) has a rectangular cuboid configuration with square cross-sectional shape. As best shown in FIGS. 16-17, the BWR fuel assemblies 150 may be of the GE14 type first introduced in the 1990s or GNF2 type both by General Electric-Hitachi Nuclear Energy. Each fuel assembly is independently liftable and may include a handle 152 at the top end for lifting the assembly to insert or remove assemblies from bottom end of fuel assembly 150 may include a debris filter 151 surrounded by an open protective cage structure 153 shown to prevent debris in the fuel pool from flowing upwards into the fuel assembly via natural convective thermo-siphon flow previously described herein. Somewhat similar style BWR fuel assemblies are available from Mitsubishi Nuclear Fuel, Westinghouse, and other manufacturers.

A common feature shared by all of the foregoing BWR fuel assemblies 150 is the provision of a conical lower end 154 which is used to support the weight of the fuel assembly in the fuel rack 100. A fuel assembly support ring 155 is rigidly affixed to the top surface of the fuel rack baseplate 140 at the bottom of each cell 110. Ring 155 is configured to at least partially receive and engage the conical lower end of the fuel assembly to center and support the assembly therein (see, e.g., FIGS. 8 and 13-14). Each support ring 155 is located above and around each flow hole 142 formed through baseplate 140 so as to be in fluid communication therewith to allow the upflow of cool pool water beneath the fuel rack through the fuel assembly 150 for cooling. Each support ring 155 thus defines a central flow hole 156 which is concentrically and coaxially aligned with a respective flow hole 142 in each fuel storage cell. The support ring flow hole 156 is circumscribed by an annular angled seating surface 157 inside support ring 155 which engages the conical lower end 154 of the fuel assembly. Angled seating surface 157 has a complementary configured angle to the angle of the lower conical end 154 of the fuel assembly such that a flat-to-flat (albeit angled) interface is formed therebetween.

The fuel rack reactivity control device comprising the neutron absorber inserts 200 which can be mounted inside each fuel storage cell 110 of fuel rack 100 will now be further described.

Referring to FIGS. 9-15, the cells 110 may each include at least one neutron absorber insert 200 disposed inside the cell cavity 118. Each insert preferably extends vertically in height to cover at least the “active fuel region” of the fuel rack cells 110 where the nuclear fuel in the fuel assemblies 150 is stored when the fuel assembly is positioned in the fuel rack 100.

Each neutron absorber insert 200 is an insert assembly comprising a vertically elongated body 201, a lower attachment plate 202, and a locking feature formed by at least one locking member 203 comprising radial locking protrusions 206 configured to engage one of the raised support rings 155 in each cell 110 (further described herein). Each insert 200 defines a longitudinal axis LA which is oriented vertically when the inserts are installed in the fuel rack cells 110. Insert 200 includes a top end 200*a* and opposite bottom end 200*b* to which the attachment plate and locking plate are coupled to body 201, as further described herein. The body defines one or more elongated walls 200*c* which extend vertically between the top and bottom ends of the insert.

In one embodiment, the body of each neutron absorber insert 200 may comprise at least one elongated boron-containing absorber plate 210 operable to ameliorate neutron radiation streaming, thereby providing a reactivity control device for each fuel rack cell 110. Absorber plates 210 may have a length L1 which extends in height for at least the height thereof the “active fuel region” of each cell. Accordingly, the absorber plates therefore have a length L1 which extends for a majority of the height H1 of the fuel rack cellular body 101 and cells 110 which is measured from the top surface of baseplate 140 to the top end 100*a* of the cellular body (including the cells 110 and associated cells walls 111). In one embodiment, length L1 of the absorber plates 210 may be substantially coextensive (e.g., 95% or more) with height H1 of the cellular body 101 and cells 110.

In some embodiments as illustrated, the absorber plates 210 may each have a chevron shape to create a neutron radiation barrier for two adjacent cells walls 111 of each fuel storage cell 110. In other possible embodiments (not shown), two chevron shaped absorber plates 210 may be provided for insertion into each cell 110 to create a neutron radiation barrier for all four walls of the cell. This forms a generally tubular and hollow structure with four walls 200*c*. The number of chevron plates provided for each cell may be dictated in part by the level of reactivity control needed for individual cells of the fuel rack 100 and customized by provision of one or two chevron plate assemblies.

In one non-limiting fabrication technique, each chevron shaped absorber plate 210 may comprise a one-piece monolithic plate which is bent along one or more longitudinal bend lines BL into the chevron shape. This defines two adjoining perpendicularly angled plate walls 200*c* with a 90 degree angle corner 200*d* therebetween; one plate wall being on each side of bend line BL. Two bend lines are shown to produce a more rounded and radiused corner 200*d* rather than a sharp corner if a single bend line is used. Either is acceptable however. Other fabrication methods may of course be used including for example without limitation forming two flat and elongated absorber plates 210 and welding the two plates together at a 90 degree angle along adjoining longitudinal edges of the plates which forms a weld seam.

In other embodiments, a four-walled single unitary tube structure (monolithic) may instead be extruded of the same boron-containing plate material. In other possible embodiments, a single flat absorber plate 210 may be provided if only a neutron radiation barrier of one cell wall 111 is needed. The present neutron absorber insert 200 thus advantageously allows the reactivity control measures to be customized for each cell as needed. Reactivity control between adjacent cells 110 of the fuel rack 100 may be based on directional considerations which therefore can be accommodated by provided absorber insert 200 including one absorber wall, two walls, three walls, or a full four walls.

The absorber plate 201 (or tube structure if used) may be made of a suitable rigid boron-containing metallic poison material such as without limitation borated aluminum. In some embodiments, without limitation, the absorber plates 201 may be formed of a rigid metal-matrix composite material, and preferably a discontinuously reinforced aluminum/boron carbide metal matrix composite material, and more preferably a boron impregnated aluminum. One such suitable material is sold under the tradename METAMIC® available from Holtec International of Camden, New Jersey. Other suitable borated metallic materials suitable to form rigid plates however may be used. The rigid structure of the foregoing absorber plate radiation poison material provide resistance to abrasion and damage when the fuel assemblies (see, e.g., FIGS. 16-17) are slid downwards into the open cells 110 of the rack by overhead rigging (e.g., hoists/cranes) positioned above the fuel pool. Fuel racks are typically loaded with fuel assemblies while submerged beneath the surface of the pool water W. The boron carbide aluminum matrix composite material of which the absorber plates 201 are constructed includes a sufficient amount of boron carbide so that the absorber sheets can effectively absorb neutron radiation emitted from a spent fuel assembly, and thereby shield adjacent spent fuel assemblies in a fuel rack from one another. The absorber plates may be constructed of an aluminum boron carbide metal matrix composite material that is about 20% to about 40% by volume boron carbide. Of course, other percentages may also be used. The exact percentage of neutron absorbing particulate reinforcement which is in the metal matrix composite material, in order to make an effective neutron absorber for an intended application, will depend on a number of factors, including the thickness (i.e., gauge) of the absorber plates 201, the spacing between adjacent cells within the fuel rack, and the radiation levels of the spent fuel assemblies.

The attachment plates 202 and locking member(s) 203 are fixedly coupled to the bottom ends 200*b* of the absorber plates 210. In one non-limiting construction, the bottom end of the absorber plate 210 may be directly coupled to the metallic attachment plate 202 to form part of the neutron absorber insert assembly. The attachment plate 202 provides an intermediate coupling member used to indirectly couple locking member(s) 203 to the absorber plate or plates 210, as further described herein.

Attachment plate 202 may have a rectilinear shaped body (e.g., square in the illustrated embodiment) which defines a central aperture 204. The aperture may be circular in one embodiment as shown. Aperture 204 is concentrically and coaxially alignable with the flow hole 142 in baseplate 140 (and flow hole 156 of the fuel assembly support ring 155) located within each cell 110 into which the neutron absorber insert 200 is being installed. Attachment plate 202 is formed a suitable strong rigid metallic material of suitable thickness such as steel, preferably stainless steel for corrosion resistance when the fuel rack 100 is immersed in the fuel pool 40.

Because the boron-containing aluminum absorber plates 210 are generally not metallurgically compatible with and amenable to welding directly to the steel attachment plate 202, non-welded mechanical coupling means such as mechanical fasteners 215 including without limitation clips, rivets, threaded fasteners, etc. are preferably used to secure the absorber plate to the attachment plate. In one example as shown, mechanical fasteners 215 which may be screws are inserted through mating mounting holes 215*a* formed in the lower end of the absorber plate 210 to engage corresponding threaded holes 215B formed the sides 202*a* of attachment plate 202 (see, e.g., FIGS. 10-12). To help align the holes 215*a*, 215*b*, elongated guide slots 216*a* are formed through the lower end absorber plate 210 which insertably receive a mating complementary configured guide projection 216 formed on the sides 202*a* of the attachment plate 202. For a chevron-shaped absorber plate 210 as shown, a pair of guide projections 216 may be formed on each side of the attachment plate which will abuttingly engage one of the walls 200*c* of the absorber plate. The guide projections and mating slots may be rectilinear (e.g., rectangular) in one embodiment. Other shaped projections and complementary configured slots may be provided in other embodiments.

If a second chevron shaped absorber plate 210 is to be attached to the same attachment plate to form a tubular shaped neutron absorber insert, the same coupling method, fasteners, and guide projections may be provided and used for the second absorber plate.

The neutron absorber insert locking mechanism which fixedly anchors each absorber insert 200 in a respective cell 110 of the fuel rack 100 is formed by the previously cited locking member(s) 203. In a first embodiment and type shown in FIGS. 8-12 and 15, the locking members may comprise a plurality of discrete locking plates 203A which are fixedly coupled to attachment plate 202 via mechanical fasteners (e.g., threaded fasteners such as screws, rivets, clips, etc.) or welding. Four locking plates 203A spaced circumferentially apart around central aperture 204 of the attachment plate 202 may be provided. Few or more locking plates 203A may be employed in other embodiments depending on the magnitude of the frictional engagement required between the locking plates and fuel assembly support rings 155 further described below.

Each locking plate 203A comprises a mounting portion 203A-1 affixed to the bottom surface (i.e. underside) of attachment plate 202 as shown and a plurality of resiliently deformable radial locking protrusions 206 protruding radially inwards therefrom into central aperture 204 of the attachment plate 202. Accordingly, each locking plate 203A comprises a cluster of locking protrusions. Locking protrusions 206 are deflectable and frictionally engageable with a respective one of the raised cylindrical support rings 155 at the bottom of each fuel assembly storage cell 110 on the baseplate 140 when the insert is installed in the cell. The locking protrusions 206 may be tooth-shaped as shown; however, other shaped locking protrusions may be used to frictionally engage the raised support rings 155 of the fuel rack baseplate 140.

Figure 18A:
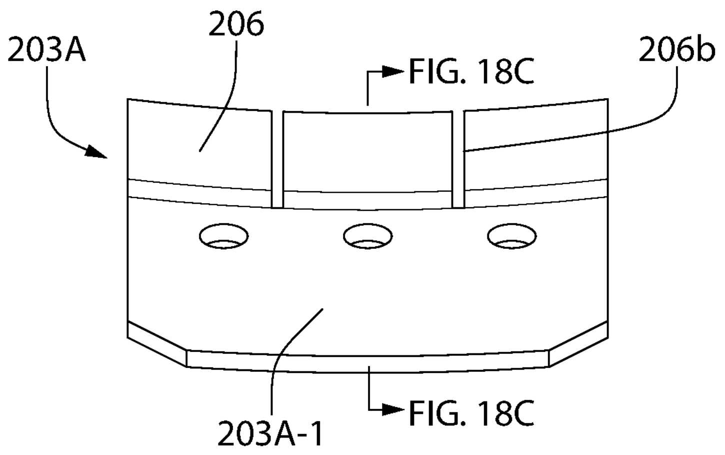
FIG. 18A is first top perspective view of a first embodiment of a locking plate with locking protrusions of the neutron absorber insert.
Figure 18B:
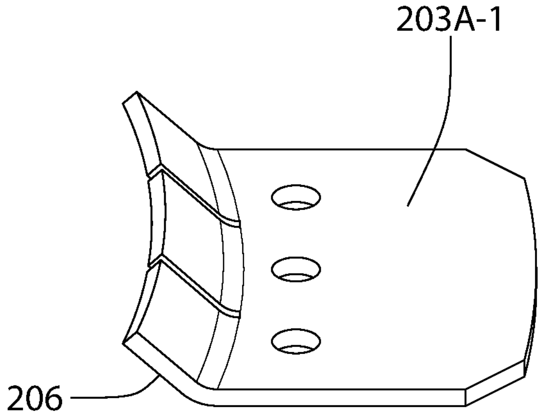
FIG. 18B is a second top perspective view thereof.
Figure 18C:
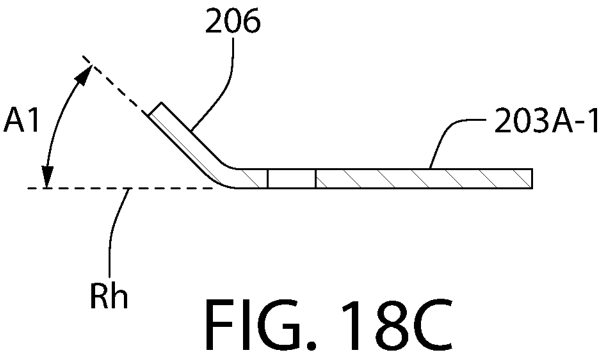
FIG. 18C is a side cross-sectional view thereof.

Referring to FIGS. 18A-C, locking protrusions 206 of each locking plate 203A are angular so as to be oriented at an upward angle A1 relative to a horizontal reference plane Rh defined by the top surface of the locking plate. Locking protrusions 206 may be pre-bent at angle A1 when initially fabricated before use with fuel rack 100 (and engagement with a fuel assembly support ring 155). Angle A1 may be between 0 and 90 degrees to horizontal reference plane Rh. The pre-angled locking protrusions are configured to further deflect in an upwards direction when the neutron absorber insert 200 is inserted into the cell and the locking protrusions engage and grip the support ring 155, thereby forming a secure frictional engagement therebetween which anchors the insert in the cell 110.

The locking protrusions may further be arcuately curved slightly from side to side in some embodiment (see, e.g., FIG. 18B), or straight from side to side.

Although each neutron absorber insert may contact the inside surfaces of the fuel rack cells walls when either fully mounted in fuel rack 100 or when inserting the inserts into the storage cells 110), it bears noting that there is no locking or frictional engagement between the neutron absorber insert 200 and the cells walls 111 which can be considered to secure the inserts in cells 110 unlike other styles neutron absorber inserts which attach directly to the cell walls. Accordingly, the cell walls do not form part of the insert mounting system. The sole locking engagement for anchoring the inserts in cells 110 to the fuel rack 100 is at the bottom of each neutron absorber insert 200 between the locking member(s) 203 (i.e. locking plates 203A or singular locking plate 203B described below) and the raised support rings 155 on baseplate 140 at the bottom of each fuel assembly storage cell.

The locking protrusions 206 may be integrally formed with locking plates 203A when fabricated as a unitary structural and monolithic part thereof. Each locking protrusion in one non-limiting configuration may have a free end 206*a* which frictionally engages an outward facing annular side surface 158 formed around the periphery of the support ring fuel rack support ring 155. Particularly, the locking protrusions apply a radial inward compression force against the side surface 158 of support ring 155 when engaged therewith to secure the neutron absorber insert 200 in the cell 110. Free ends 206*a* of the locking protrusions may be squared-off (e.g., straight and linear) in some embodiments. In other embodiments, as depicted in the illustrated embodiment, the free ends of each locking protrusion may be arcuately curved to substantially conform to the radius of curvature of the annular side surface 158 of the corresponding fuel assembly support ring 155 on baseplate 140 in each cell which is engaged by the locking protrusions to facilitate greater mutual engagement therebetween.

The free ends 206*a* of locking protrusions 206 define a reference circle forming an imaginary inner diameter which is slightly smaller than the outer diameter of the fuel assembly support ring 155 in each cell 110 on baseplate 140. Pressing the attachment plate 202 down over the fuel assembly support ring forces the protrusions 206 to the flex and deflect creating a spring-like radially inward acting compression of the teeth against the annular side surface of the fuel assembly support ring. Once pressed to the full-downward position on the support ring, the sharp edges of the upwardly pre-bent locking protrusions (e.g., teeth) frictionally bite into the cylindrical outward facing annular side surface 158 face of the assembly support ring, thereby preventing direct removal of the neutron absorber insert 200 from the cell 110 by attempting to withdraw the insert in a vertical direction along the vertical centerline axis CA of the fuel rack 100. In fact, any applied forces acting to pull the insert 200 vertically upward conversely causes the protrusions 206 to bite harder into the support ring 155 because of the upward pre-bent angle of the protrusions, thereby actually increasing the frictional engagement therebetween to prevent dislodgement of the insert when a fuel assembly 150 is inserted into or retrieved from one of the fuel assembly storage cells 110.

In one embodiment, each locking protrusion 206 may be separated and spaced apart from adjacent locking protrusions in the by a linear separation slit 206*b*. Slits 206*b* may have an angular width less than the angular width of each locking protrusion 206 as shown.

Figure 19:
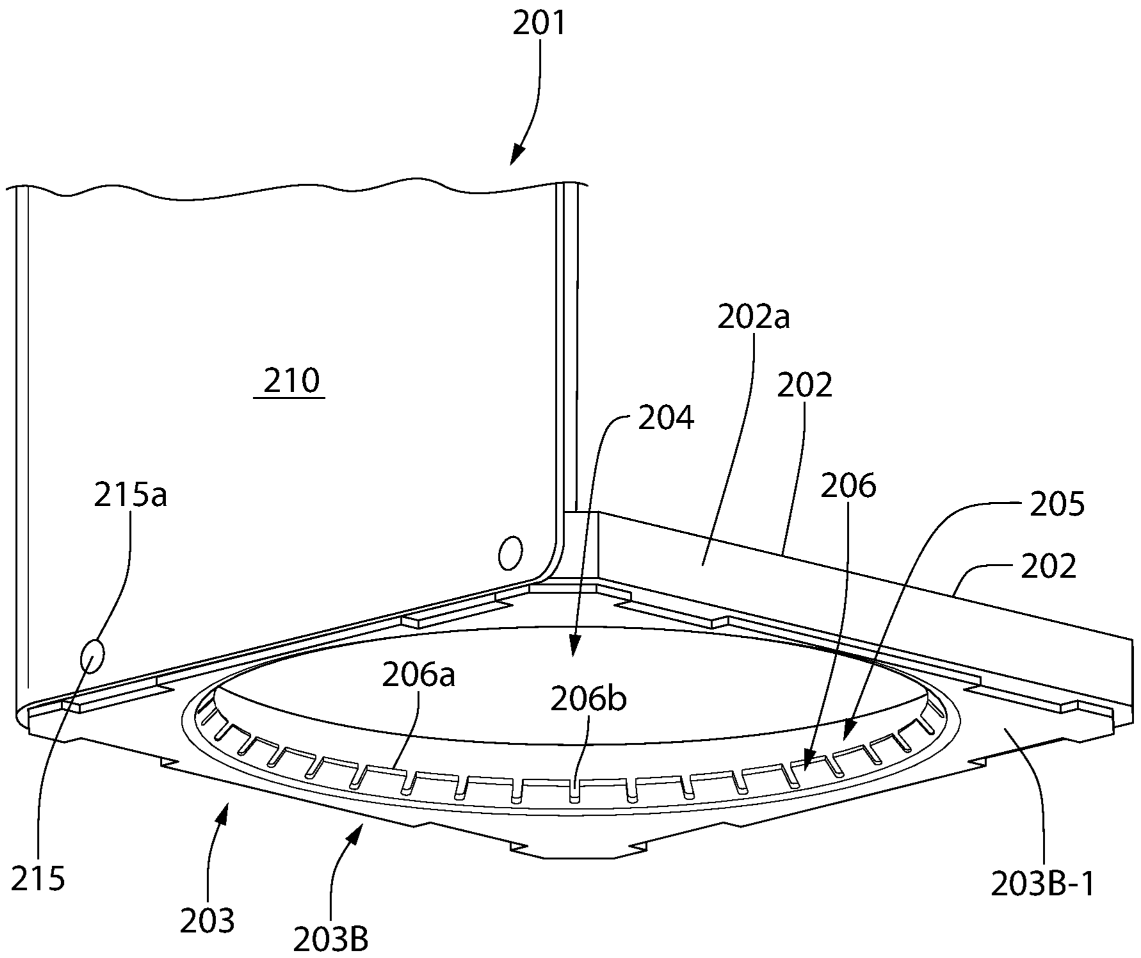
FIG. 19 is a bottom perspective view of the neutron absorber insert showing a second embodiment of a locking plate with a circular array of locking protrusions.

FIG. 19 shows a second embodiment and style of a locking member 203 comprising a single larger locking plate 203B. Locking plate 203B comprises a full 360 degree circumferential array of resiliently deformable locking protrusions 206 instead of several spaced apart locking plates 203A previously described herein. Locking plate 203B may be complementary configured (including shape and width) to the respective attachment plate 202 to which it is coupled. Accordingly, the singular locking plate 203B may have a rectilinear shaped body (e.g., square in the illustrated embodiment) which includes a peripherally extending mounting portion 203B-1 for coupling to bottom surface (i.e. underside) of attachment plate 202 via mechanical fasteners (e.g., threaded fasteners such as screws, rivets, clips, etc.) or welding. Locking plate 203B defines a central engagement opening 205 which is concentrically and coaxially alignable with the central aperture 204 of attachment plate 202 when coupled thereto. Each engagement opening 205 is further concentrically and coaxially alignable with a corresponding flow hole 142 in baseplate 140 (and flow hole 156 of the fuel assembly support ring 155) located within each cell 110 when the neutron absorber insert 200 is installed in one of the fuel rack cells 110.

Although locking plate 203B may show a full 360 degree circumferential array of locking protrusions in FIG. 19, spaced apart clusters of locking protrusions may alternatively be provided in alternative embodiments which protrude radially into engagement opening 205.

The larger single locking plate 203B functions in the same manner as the plural smaller locking plates 203A previously described herein to lock the neutron absorber insert 200 into a fuel assembly storage cell 110 of the fuel rack 100. It will not be repeated here for sake of brevity.

Both embodiments of locking plates 203A and 203*b* (depending on which is used) may be smaller in thickness than the attachment plate 202 which has a thicker more robust structure for directly coupling the absorber plate or plates 210 thereto to provide rigid fixation. The thinner locking plate(s) allow the locking protrusions to be more readily formed via fabrication methods such as stamping and cutting, and also provides the necessary resiliently deformable flexibility desired for locking protrusions 206 to more securely frictionally engage and grip the fuel assembly support rings 155 on baseplate 140 inside each fuel assembly storage cell 110.

Attachment plate 202 may be formed a suitable strong and rigid metallic material of suitable thickness such as steel, preferably stainless steel for corrosion resistance when the fuel rack 100 is immersed in the fuel pool 40. Locking plates 203A or 203B (depending on which is used) may be formed of a similar metallic material (e.g., steel or preferably stainless steel) or a different material such as aluminum or other which preferably offers corrosion resistance when wetted.

A method or process of installing a reactivity control device in a fuel assembly storage cell 110 of a nuclear fuel rack 100 will now be briefly summarized. The method comprises inserting a neutron absorber insert 200 into the storage cell, and frictionally engaging a bottom end of the neutron absorber insert with the raised support ring 155 of the fuel rack disposed at a bottom of the cell. More specifically, in some embodiments, the frictionally engaging step includes frictionally engaging a plurality of the resiliently deformable radial locking protrusions 206 formed on the bottom end of the neutron absorber insert with the support ring 155 to lock the neutron absorber insert thereto. The locking protrusions 206 may be disposed and arranged on at least one locking plate 203 (e.g., multiple locking plates 203A or singular locking plate 203B) disposed on the bottom end of the neutron absorber insert 200; more specifically on attachment plate 202 in some embodiments. The locking protrusions whether disposed on locking plates 203A or 203B project radially inwards into central aperture 204 of attachment plate 202 at the bottom end of the neutron absorber insert which receives the support ring 155 at least partially therein during the frictionally engaging step. The locking protrusions 206, which may be pre-bent at angle A1 as previously described herein, may deform and deflect further in an upward direction to increase bite on the support ring 155 on baseplate 140 at the bottom of cell 110, thereby creating tight frictional engagement therebetween to lock the insert 200 in cell 110. When the neutron absorber insert 200 is anchored and locked in the storage cell 110, the insert is rigidly secured in the cell such that the slideable insertion or removal of a fuel assembly 150 into/from the cell will not dislodge the insert or coupling to the fuel rack. The frictional engagement force is therefore greater than any sliding extraction force imparted against the neutron absorber insert 200 during insertion or removal of the fuel assembly into/from a storage cell 110 of the fuel rack.

The foregoing method or process is repeated to add a neutron absorber insert into other fuel storage cells 110 which require reactivity controls. The neutron absorber inserts 200 may be used with new fuel racks 100, or retrofit into the cells of existing fuel racks which have degraded neutron absorbing materials to refurbish the rack and re-establish proper reactivity control.

It bears noting that although the locking protrusions 206 of the neutron absorber insert 200 are described as being formed by one or more locking plates 203 affixed to the intermediate attachment plate 202 coupled to the bottom end of the insert (e.g., absorber plate 210), in other embodiments the locking protrusions may be integrally formed with the attachment plate as a unitary structural part thereof and function in the same manner described herein to frictionally engage the fuel assembly support ring 155 at the bottom of the fuel rack cells 110.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A fuel rack with reactivity control for storing spent nuclear fuel, the fuel rack comprising:

a baseplate;

a cellular body extending from the baseplate and comprising a plurality of cell walls, the cell walls defining a plurality of open cells each configured to store a nuclear fuel assembly comprising multiple fuel rods therein;

the baseplate further comprising a raised fuel assembly support ring of circular configuration disposed at the bottom of at least one cell, the support ring defining a central flow hole extending completely through the support ring and circumscribed by an annular angled seating surface which is configured to engage a complementary configured angled conical lower end of the fuel assembly;

a neutron absorber insert disposed in the at least one cell, the neutron absorber insert comprising a top end and a bottom end configured to frictionally engage the support ring in the at least one cell to secure the neutron absorber insert therein;

wherein the neutron absorber insert comprises a vertically elongated absorber plate comprising boron and a rectilinear attachment plate coupled to a lower end of the neutron absorber plate, the attachment plate comprising a central aperture configured to receive the support ring at least partially therein; and a plurality of resiliently deformable radial locking protrusions disposed on the attachment plate which project radially inwards into the central aperture of the attachment plate to frictionally engage an outward facing annular side surface of the support ring.

2. The fuel rack according to claim 1, wherein the neutron absorber insert includes at least one locking plate coupled to the attachment plate, the locking plate defining the plurality of resiliently deformable locking protrusions frictionally engaged with the support ring in the at least one cell of the fuel rack.

3. The fuel rack according to claim 2, wherein the locking protrusions comprise teeth projecting inwards into the central aperture of the attachment plate and engaging the support ring.

4. The fuel rack according to claim 3, wherein the locking protrusions are oriented at an upward angle between 0 and 90 degrees relative to a horizontal reference plane defined by the at least one locking plate.

5. The fuel rack according to claim 3, wherein the locking protrusions are configured and operable to deflect in an upwards direction when the neutron absorber insert is inserted into the at least one cell and the locking protrusions engage the support ring.

6. The fuel rack according to claim 3, further comprising a plurality of locking plates coupled to the attachment plate, the locking plates circumferentially spaced apart around the central aperture of the attachment plate.

7. The fuel rack according to claim 3, wherein the attachment plate is coupled to the neutron absorber plate via a plurality of mechanical fasteners.

8. The fuel rack according to claim 2, wherein the neutron absorber insert has a height which extends for a majority of a height of the cell.

9. The fuel rack according to claim 8, wherein the neutron absorber plate has a chevron shape comprising two walls.

10. The fuel rack according to claim 1, wherein the locking protrusions comprise upwardly bent teeth arranged in circumferentially spaced apart clusters of teeth which engage the side surface of the fuel assembly support ring at multiple circumferential locations.

11. The fuel rack according to claim 1, further comprising one fuel assembly being disposed in the at least one cell and comprising a conical lower end engaging the support ring in the at least one cell, the neutron absorber insert being interposed between at least one side of the fuel assembly and one of the cell walls in the at least one cell.

12. The fuel rack according to claim 11, wherein the locking protrusions do not engage the fuel assembly.

13. The fuel rack according to claim 1, wherein the neutron absorber insert comprises a boron-containing metal matrix composition.

14. A neutron absorber insert for a fuel rack used for wet storage of nuclear fuel, the neutron absorber insert comprising:

a neutron absorber plate including a top end and a bottom end, the neutron absorber plate configured for insertion in a fuel storage cell of the fuel rack which is configured for receiving a nuclear fuel assembly therein;

the neutron absorber plate comprising boron and a rectilinear attachment plate coupled to a lower end of the neutron absorber plate, the attachment plate comprising a central aperture configured to receive a raised support ring at least partially therein disposed at a bottom of the fuel storage cell;

a plurality of resiliently deformable radial locking protrusions disposed on the attachment plate which project radially inwards into the central aperture of the attachment plate to frictionally engage an outward facing annular side surface of the support ring;

the support ring defining a central flow hole extending completely through the support ring and circumscribed by an annular angled seating surface which is configured to engage a complementary configured angled conical lower end of the fuel assembly; and a plurality of resiliently deformable locking protrusions disposed on the bottom end of the neutron absorber plate, the locking protrusions projecting radially inwards into the central aperture of the attachment plate and operable to frictionally engage the raised fuel assembly support ring disposed on the fuel rack at a bottom of the fuel storage cell.

15. A fuel rack with reactivity control for storing spent nuclear fuel, the fuel rack comprising:

a baseplate comprising at least one flow hole;

a cellular body extending from the baseplate and comprising a plurality of cell walls, the cell walls defining a plurality of open cells each configured to store a nuclear fuel assembly therein;

a support ring disposed at a bottom of at least one of the open cells and affixed to the baseplate, the support ring comprising a flow hole aligned with the at least one flow hole of the baseplate; and a neutron absorber insert disposed in the at least one of the open cells, the neutron absorber insert comprising a top end and a bottom end configured to frictionally engage the support ring in the at least one of the open cells to secure the neutron absorber insert therein.

16. The fuel rack according to claim 15, wherein the neutron absorber insert further comprises an attachment plate, the attachment plate comprising an aperture aligned with the flow hole of the baseplate and the flow hole of the support ring.

17. The fuel rack according to claim 16, wherein the support ring comprises an annular angled seating surface which is configured to engage a complementary configured angled conical lower end of the nuclear fuel assembly.

18. A neutron absorber insert for a fuel rack used for wet storage of nuclear fuel, the neutron absorber insert comprising:

a neutron absorber plate including a top end and a bottom end, the neutron absorber plate configured for insertion into a fuel storage cell of the fuel rack; and an attachment plate coupled to the bottom end of the neutron absorber plate, the attachment plate comprising an aperture.

19. The neutron absorber insert according to claim 18, wherein the neutron absorber plate has a chevron shape, and the attachment plate is perpendicularly coupled to the neutron absorber plate.

20. The neutron absorber insert according to claim 18 further comprising at least one locking member comprising a plurality of resiliently deformable locking protrusions, the at least one locking member affixed to the attachment plate, the plurality of resiliently deformable locking protrusions of the at least one locking member configured to frictionally engage a fuel assembly support ring disposed on the fuel rack at a bottom of the fuel storage cell.

* * * * *